(12) United States Patent  (10) Patent No.: US 8,941,843 B2
Nagai  (45) Date of Patent: Jan. 27, 2015

(54) LIGHT INTERFERENCE SYSTEM AND SUBSTRATE PROCESSING APPARATUS

(71) Applicant: Tokyo Electron Limited, Tokyo (JP)

(72) Inventor: Kenji Nagai, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 119 days.

(21) Appl. No.: 13/898,664

(22) Filed: May 21, 2013

(65) Prior Publication Data

US 2013/0314713 A1   Nov. 28, 2013

Related U.S. Application Data

(60) Provisional application No. 61/654,279, filed on Jun. 1, 2012.

(30) Foreign Application Priority Data

May 22, 2012   (JP) ................. 2012-116811

(51) Int. Cl.
*G01B 11/06* (2006.01)
*G01K 11/12* (2006.01)

(52) U.S. Cl.
CPC ............... *G01K 11/12* (2013.01); *G01B 11/06* (2013.01); *G01K 11/125* (2013.01)
USPC ........................................................ 356/503

(58) Field of Classification Search
CPC ............... G01J 3/453; G01J 5/08; G01J 3/45; G01J 3/26; G01J 9/02; G01J 3/0208; G01J 5/0821; G01B 11/0675; G01B 11/06; G01B 9/0209; G01B 11/0625; G01B 9/02; G01B 9/02057; G01B 11/2441; G01B 9/02021; G01B 2290/45; G01B 9/02027; G01B 9/02084; G01B 21/45; G01B 9/02017; G01B 9/02018; G01N 2021/3595; G01N 21/8422; G01N 21/55; G01N 2021/7779; G01K 11/12; G01K 11/00; G01K 11/125; G01K 5/00
USPC ........... 356/503, 43, 451, 450, 630, 479, 496, 356/303, 514, 482, 504; 374/130, 129, 121, 374/137; 250/339.08, 339.07, 559.27; 358/130

See application file for complete search history.

(56) References Cited

U.S. PATENT DOCUMENTS 5,341,205 A * 8/1994 McLandrich et al. ........ 356/73.1
7,099,015 B2 * 8/2006 Melnyk ......................... 356/480
2004/0105101 A1 * 6/2004 Shinya et al. ................. 356/630
2008/0266550 A1 * 10/2008 Nishida et al. ................. 356/73

FOREIGN PATENT DOCUMENTS

DE   102013201611 A1 *  7/2014   ............ G01B 9/02
EP       2336714 B1 *  5/2014   ............ G01B 9/02
JP     2012-063149 A      3/2012

* cited by examiner

*Primary Examiner* — Tarifur Chowdhury
*Assistant Examiner* — Mohamed Amara
(74) *Attorney, Agent, or Firm* — Pearne & Gordon LLP

(57) ABSTRACT

A light interference system and a substrate processing apparatus can suppress loss of reflection spectrum. The light interference system 1 includes a light source 10, a coupler 41, multiple collimators 12A and 12B, a collimator 42, a mirror 43, a spectrometer 14, and an operation unit 15. The collimator 42 and the mirror 43 are provided at a side of multiple input terminals except a first input terminal and configured to send reflected lights from multiple output terminals to the multiple output terminals again.

5 Claims, 19 Drawing Sheets

LIGHT INTERFERENCE SYSTEM AND SUBSTRATE PROCESSING APPARATUS

CROSS-REFERENCE TO RELATED APPLICATION

This application claims the benefit of Japanese Patent Application No. 2012-116811 filed on May 22, 2012, and U.S. Provisional Application Ser. No. 61/654,279 filed on Jun. 1, 2012, the entire disclosures of which are incorporated herein by reference.

FIELD OF THE INVENTION

Various aspects and illustrative embodiments of the present disclosure relate to a light interference system and a substrate processing apparatus.

BACKGROUND OF THE INVENTION

Patent Document 1 describes a kind of light interference system. The light interference system described in Patent Document 1 emits a measurement light to a measurement target object, and then, measures interference peaks of reflected lights from a front surface and a rear surface of the measurement target object. Further, the light interference system measures a temperature of the measurement target object based on an optical path length between peaks obtained by Fourier transform of the measured interference peaks. Herein, the light interference system described in Patent Document 1 includes a coupler. By using this coupler, a measurement light (incident spectrum) introduced through a single input terminal is split through N optical transmission paths at an output side to be emitted from N output terminals toward N measurement points. Furthermore, reflected lights (reflection spectrum) from the N measurement points are multiplexed to be detected from the single input terminal. Therefore, it is possible to easily measure temperatures of the multiple measurement points.

Patent Document 1: Japanese Patent Laid-open Publication No. 2012-063149

The coupler provided in the light interference system described in Patent Document 1 is formed typically by fusing multiple optical fibers. By way of example, this coupler may be formed by fusing N optical fibers having input terminals and output terminals, and by performing an antireflection process on the input terminals of (N−1) optical fibers or providing antireflection-processed light terminators at the input terminals of the (N−1) optical fibers.

However, in the coupler formed as described above, an intensity of the multiplexed reflection spectrum is reduced to 1/N, and, thus, measurement accuracy may be deteriorated. Accordingly, a light interference system capable of suppressing loss of reflection spectrum and a substrate processing apparatus are demanded.

BRIEF SUMMARY OF THE INVENTION

In accordance with one aspect of illustrative embodiments, there is provided a light interference system of measuring a thickness or a temperature of a measurement target object having a first main surface and a second main surface facing the first main surface. The light interference system includes a light source configured to emit a measurement light having a wavelength that transmits the measurement target object; a coupler having multiple input terminals and multiple output terminals corresponding to the multiple input terminals, at least one of the multiple input terminals serving as a first input terminal configured to receive the measurement light from the light source; multiple first collimators respectively connected to the multiple output terminals of the coupler, each being configured to emit the measurement light to the first main surface of the measurement target object and to receive reflected lights from the first main surface and the second main surface; a transmission device provided at a side of the multiple input terminals except the first input terminal and configured to send the reflected lights from the multiple output terminals to the multiple output terminals again; a spectrometer connected to the first input terminal and configured to measure an interference intensity distribution that is an intensity distribution of the reflected lights from the first main surface and the second main surface, the interference intensity distribution being dependent on a wavelength; and a measurement unit connected to the spectrometer and configured to measure a thickness or a temperature of the measurement target object based on a waveform obtained by Fourier transform of the interference intensity distribution.

In the above-described light interference system, if reflected lights from the multiple output terminals are incident to the multiple input terminals except the first input terminal connected to the light source and the spectrometer, the reflected lights are transmitted to the multiple output terminals again by the transmission device. Thus, the input terminal, which is not used at the time of measurement, does not serve as an termination end by an antireflection process and the reflected lights are transmitted again toward the measurement target object. As a result, quantity of light incident to the first input terminal can be increased. Therefore, it is possible to suppress loss of reflection spectrum.

The transmission device may include mirrors provided at least one of the multiple input terminals except the first input terminal. Since the mirrors are provided at the multiple input terminals, the reflected lights can be transmitted to the multiple output terminals with little loss.

The transmission device may be configured to connect two input terminals selected from the multiple input terminals except the first input terminal. With this configuration, the reflected lights can be transmitted to the multiple output terminals with less loss.

The transmission device may include second collimators respectively connected to the multiple input terminals except the first input terminal; and mirrors provided to face the second collimators.

In accordance with another aspect of illustrative embodiments, there is provided a substrate processing apparatus including a light interference system of measuring a thickness or a temperature of a measurement target object having a first main surface and a second main surface facing the first main surface. The substrate processing apparatus includes a processing chamber configured to be evacuated and to accommodate therein the measurement target object. Further, the light interference system includes a light source configured to emit a measurement light having a wavelength that transmits the measurement target object; a coupler having multiple input terminals and multiple output terminals corresponding to the multiple input terminals, at least one of the multiple input terminals serving as a first input terminal configured to receive the measurement light from the light source; multiple first collimators respectively connected to the multiple output terminals of the coupler, each being configured to emit the measurement light to the first main surface of the measurement target object and to receive reflected lights from the first main surface and the second main surface; a transmission device provided at a side of the multiple input terminals except the first input terminal and configured to send the reflected lights from the multiple output terminals to the multiple output terminals again; a spectrometer connected to the first input terminal and configured to measure an interference intensity distribution that is an intensity distribution of the reflected lights from the first main surface and the second main surface, the interference intensity distribution being dependent on a wavelength; and a measurement unit connected to the spectrometer and configured to measure a thickness or a temperature of the measurement target object based on a waveform obtained by Fourier transform of the interference intensity distribution.

In the substrate processing apparatus, when measuring a thickness or a temperature of the measurement target object accommodated in the processing chamber, the light interference system is used. In the light interference system, if lights reflected from the multiple output terminals return to the multiple input terminals except the first input terminal ted to the light source and the spectrometer, the reflected lights are transmitted to the multiple output terminals again by the transmission device. Thus, an input terminal, which is not used at the time of measurement, does not serve as an termination end by an antireflection process and the reflected lights are transmitted again toward the measurement target object. As a result, the quantity of light incident to the first input terminal can be increased. Therefore, it is possible to suppress loss of reflection spectrum.

As explained above, in accordance with various aspects and illustrative embodiments of the present disclosure, a light interference system capable of extending a range of a thickness, which can be measured by the light interference system, without changing resolution of a spectrometer of the light interference system and a substrate processing apparatus are provided.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which:

FIG. 6A shows a spectrum of an intensity distribution depending on a position and FIG. 6B shows a spectrum of an intensity distribution depending on a wave number;

FIG. 7A is a schematic diagram for explaining light loss of a conventional light interference system and FIG. 7B is a schematic diagram for explaining light loss of the light interference system depicted in FIG. 1;

FIG. 9A provides a light source spectrum showing an intensity distribution depending on a wavelength. FIG. 9B provides a reflected light spectrum showing an intensity distribution depending on a wavelength, and FIG. 9C provides a spectrum obtained by Fast Fourier Transform of the reflected light spectrum of FIG. 9B;

DETAILED DESCRIPTION OF THE INVENTION

Figure 1:
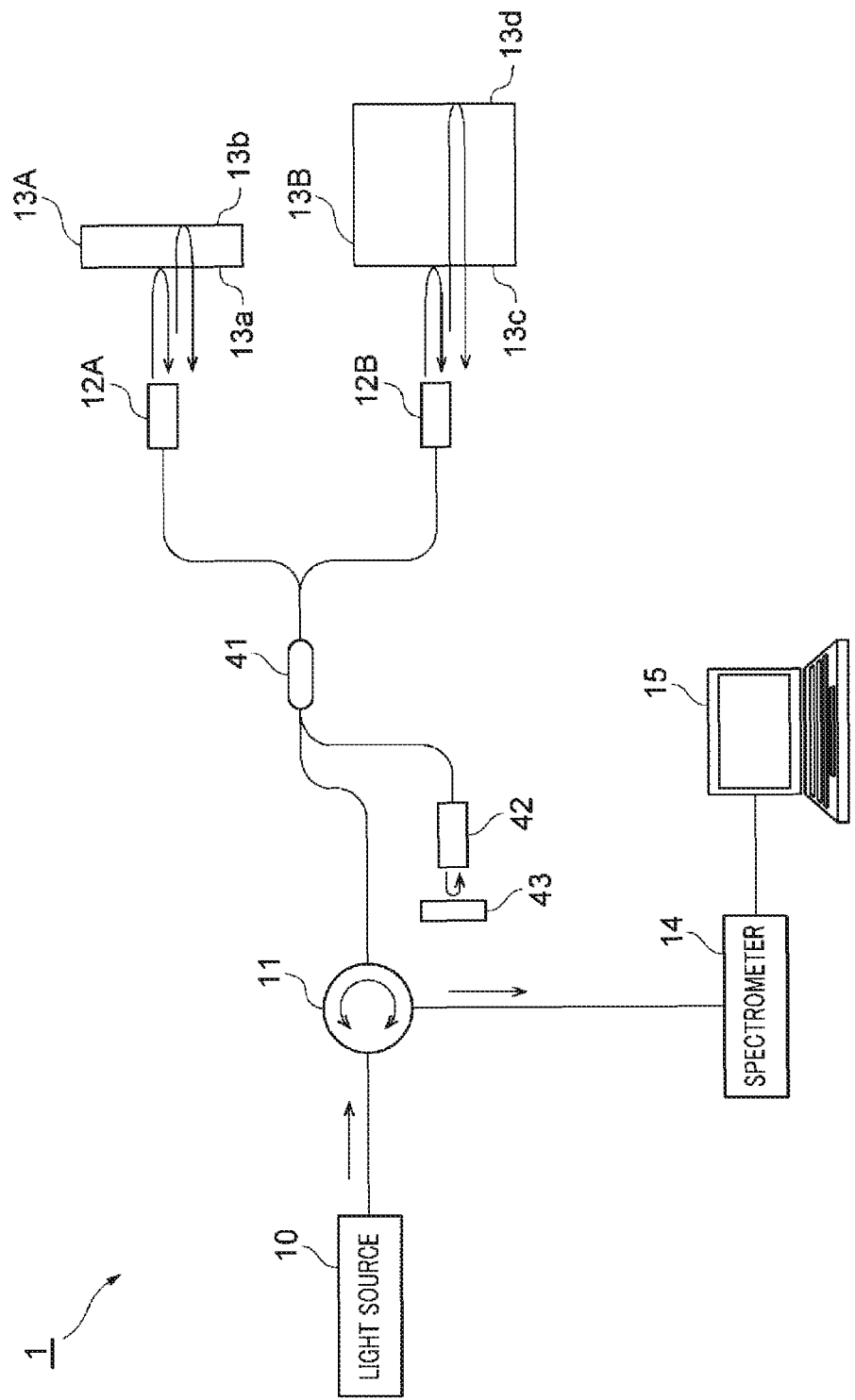
FIG. 1 is a schematic configuration diagram of a light interference system in accordance with an illustrative embodiment.

Hereinafter, various illustrative embodiments will be described in detail with reference to the accompanying drawings. In the drawings, like reference numerals denote like or corresponding parts.

FIG. 1 is a schematic configuration diagram illustrating an example of a light interference system in accordance with an illustrative embodiment. As depicted in FIG. 1, a light interference system 1 is configured to measure thicknesses or temperatures of measurement target objects 13A and 13B. Further, thicknesses of the measurement target objects 13A and 13B and temperatures of the measurement target objects 13A and 13B can be measured by performing substantially the same operation. Thus, hereinafter, there will be explained an example where the light interference system 1 measures temperatures of the measurement target objects 13A and 13B for the sake of easy explanation and understanding.

The light interference system 1 depicted in FIG. 1 is configured to measure temperature of the measurement target objects 13A and 13B. The light interference system 1 is configured to measure a temperature by using light interference. The light interference system 1 includes a light source 10, an optical circulator 11, a coupler 41, collimators 12A and 12B, a collimator 42 (second collimator), a spectrometer 14, and an operation unit (measurement unit) 15. Further, the light source 10, the optical circulator 11, the coupler 41, the collimators 12A, 12B and 42, and the spectrometer 14 are connected to one another by using optical fiber cables.

The light source 10 is configured to generate a measurement light having a wavelength that transmits the measurement target objects 13A and 13B. By way of example, as the light source 10, a SLD (Super Luminescent Diode) may be used. Further, the measurement target object 13A has, for example, a plate shape and includes a first main surface 13a and a second main surface 13b facing the first main surface 13a. Further, the measurement target object 13B includes a first main surface 13c and a second main surface 13d facing the first main surface 13c, and has a different thickness from that of the measurement target object 13A. Hereinafter, the first main surfaces 13a and 13c will be referred to as "front surfaces 13a and 13c" and the second main surfaces 13b and 13d will be referred to as "rear surfaces 13b and 13d" as necessary. By way of example, the measurement target objects 13A and. 13B may be made of $SiO_2$ (quartz) or $Al_2O_3$ (sapphire) in addition to Si (silicon). A refractive index of the Si is about 3.4 at a wavelength of about 4 µm. A refractive index of the $SiO_2$ is about 1.5 at a wavelength of about 1 µm. A refractive index of the $Al_2O_3$ is about 1.8 at a wavelength of about 1 µm.

The optical circulator 11 is connected to the light source 10, the coupler 41, and the spectrometer 14. The optical circulator 11 is configured to emit the measurement light generated by the light source 10 to the coupler 41. The coupler 41 includes two input terminals and two output terminals. One input terminal (first input terminal) is connected to the optical circulator 11 and the other input terminal is connected to the collimator 42. Further, the two output terminals are connected to the collimators 12A and 12B, respectively. The coupler 41 is configured to receive the light emitted from the optical circulator 11 through the one input terminal, and is configured to output the light to the two output terminals (i.e., collimators 12A and 12B).

The collimator 12A is configured to emit the measurement light to the front surface 13a of the measurement target object 13A. The collimator 12A is configured to emit the measurement light, which is adjusted to be a parallel light, to the measurement target object 13A. The collimator 12A is configured to receive reflected lights from the measurement target object 13A. The reflected lights include a reflected light from the front surface 13a and a reflected light from the rear surface 13b. The collimator 12A is configured to emit the reflected lights to the coupler 41.

The collimator 12B is configured to emit the measurement light to the front surface 13c of the measurement target object 13B. The collimator 12B is configured to emit the measurement light, which is adjusted to be a parallel light, to the measurement target object 13B. The collimator 12B is configured to receive reflected lights from the measurement target object 13B. The reflected lights include a reflected light from the front surface 13c and a reflected light from the rear surface 13d. The collimator 12B is configured to emit the reflected rights to the coupler 41.

The coupler 41 is configured to emit the reflected lights (return lights) emitted from the collimators 12A and 12B to the optical circulator 11. The collimator 42 is configured to emit the return lights to a mirror 43 arranged to face the coupler 41, and is configured to receive reflected lights from the mirror 43 to transmit the reflected lights again to the collimators 12A and 12B via the coupler 41. That is, the collimator 42 and the mirror 43 serve as transmission devices that transmit the return lights again to the measurement target objects. Such transmission devices are provided at the input terminal except the first input terminal.

Figure 2:
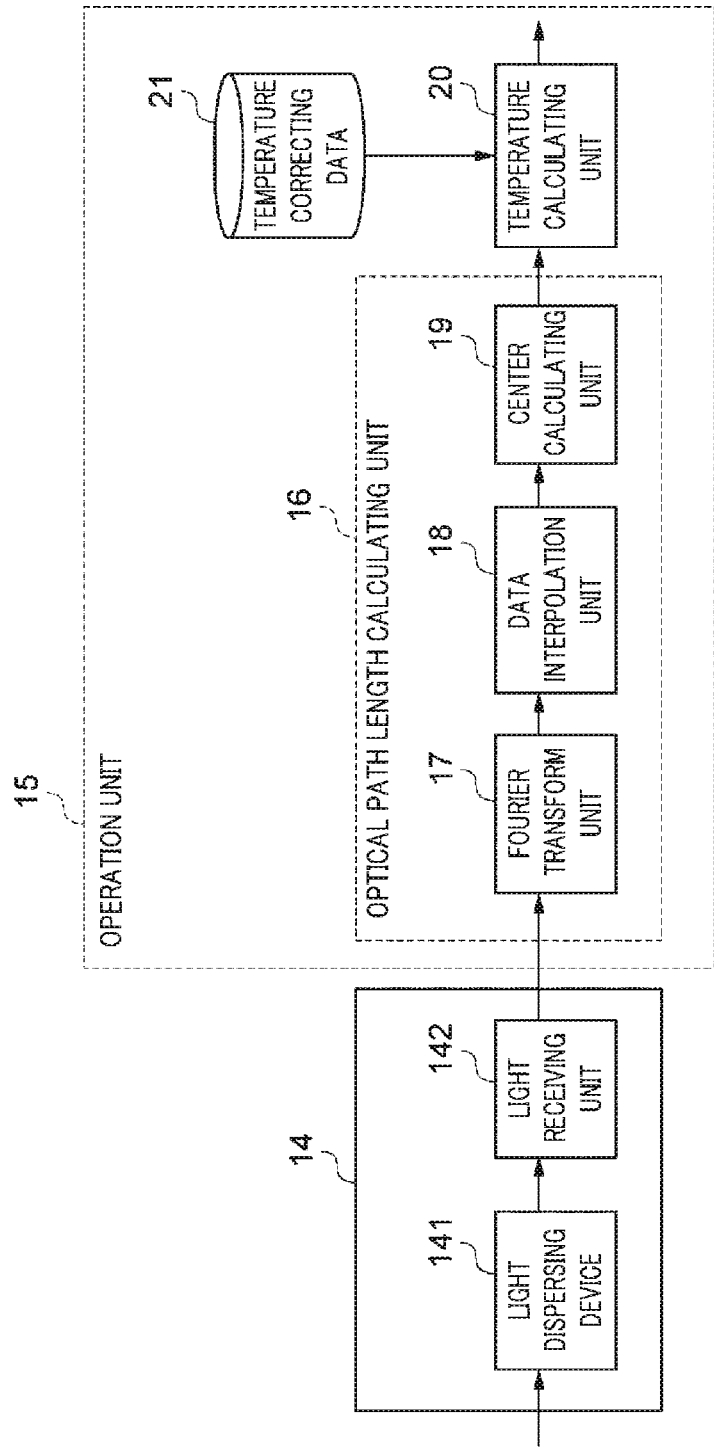
FIG. 2 is a functional block diagram of a spectrometer and an operation unit.

The optical circulator 11 is configured to emit the reflected lights to the spectrometer 14. The spectrometer 14 is configured to measure a spectrum (interference intensity distribution) of the reflected lights emitted from the optical circulator 11. The reflected light spectrum shows an intensity distribution depending on a wavelength or on a frequency of the reflected light. FIG. 2 is a functional block diagram of the spectrometer 14 and the operation unit 15. As depicted in FIG. 2, the spectrometer 14 includes, for example, a light dispersing device 141 and a light receiving unit 142. The light dispersing device 141 is, for example, a diffraction grating and is configured to disperse the light with a certain dispersion angle corresponding to a wavelength. The light receiving unit 142 is configured to receive the light dispersed by the light dispersing device 141. As the light receiving unit 142, there is used a CCD (Charge Coupled Device) in which multiple light receiving devices are arranged in a grid pattern. The number of the light receiving devices becomes the number of samplings. Further, a wavelength span is determined based on a dispersion angle of the light dispersing device 141 and a distance between the light dispersing device 141 and the light receiving device. Thus, the reflected light is dispersed at each wavelength or each frequency and intensity is acquired at each wavelength or each frequency. The spectrometer 14 is configured to output the reflected light spectrum to the operation unit 15.

The operation unit 15 is configured to measure temperatures of the measurement target objects 13A and 13B based on the reflected light spectrum. The operation unit 15 includes an optical path length calculating unit 16, a temperature calculating unit 20, and temperature correcting data 21. The optical path length calculating unit 16 includes a Fourier transform unit 17, a data interpolation unit 18, and a center calculating unit 19. The Fourier transform unit 17 performs Fourier transform on the reflected light spectrum by FFT (Fast Fourier Transform). By way of example, if Fourier transform is performed in a time domain, a reflected light spectrum showing an intensity distribution depending on a frequency (vibration number per: unit time) is transformed to a reflected light spectrum showing an intensity distribution depending on a time. Further, by way of example, if Fourier transform is performed in a space domain, a reflected light spectrum showing an intensity distribution depending on a spatial frequency (vibration number per unit length) is transformed to a reflected light spectrum showing an intensity distribution depending on a positron. The data interpolation unit 10 is configured to interpolate data points in a range including a preset peak value of the reflected light spectrum after the Fourier transform. The center calculating unit 19 is configured to calculate a central position of the preset peak value of the reflected light spectrum after the Fourier transform. The optical path length calculating unit 16 is configured to calculate an optical path length based on the central position.

The temperature calculating unit 20 is configured to calculate temperatures of the measurement target objects 13A and 13B based on the optical path lengths. The temperature calculating unit 20 calculates the temperatures of the measurement target objects 13A and 13B based on the temperature correcting data 21. The temperature correcting data 21 is data measured in advance and indicates a relationship between temperatures and optical path lengths.

The light interference system 1 configured as described above measures temperatures by using fight interference between the front surfaces 13a and 13c and the rear surfaces 13b and 13d of the measurement target objects 13A and 13B (FFT frequency domain method). Hereinafter an operation of light interference will be described. Further, the measurement target objects 13A and 13B are measured by the same method. Thus, hereinafter, there will be explained the measurement target object 13A as an example.

Figure 3:
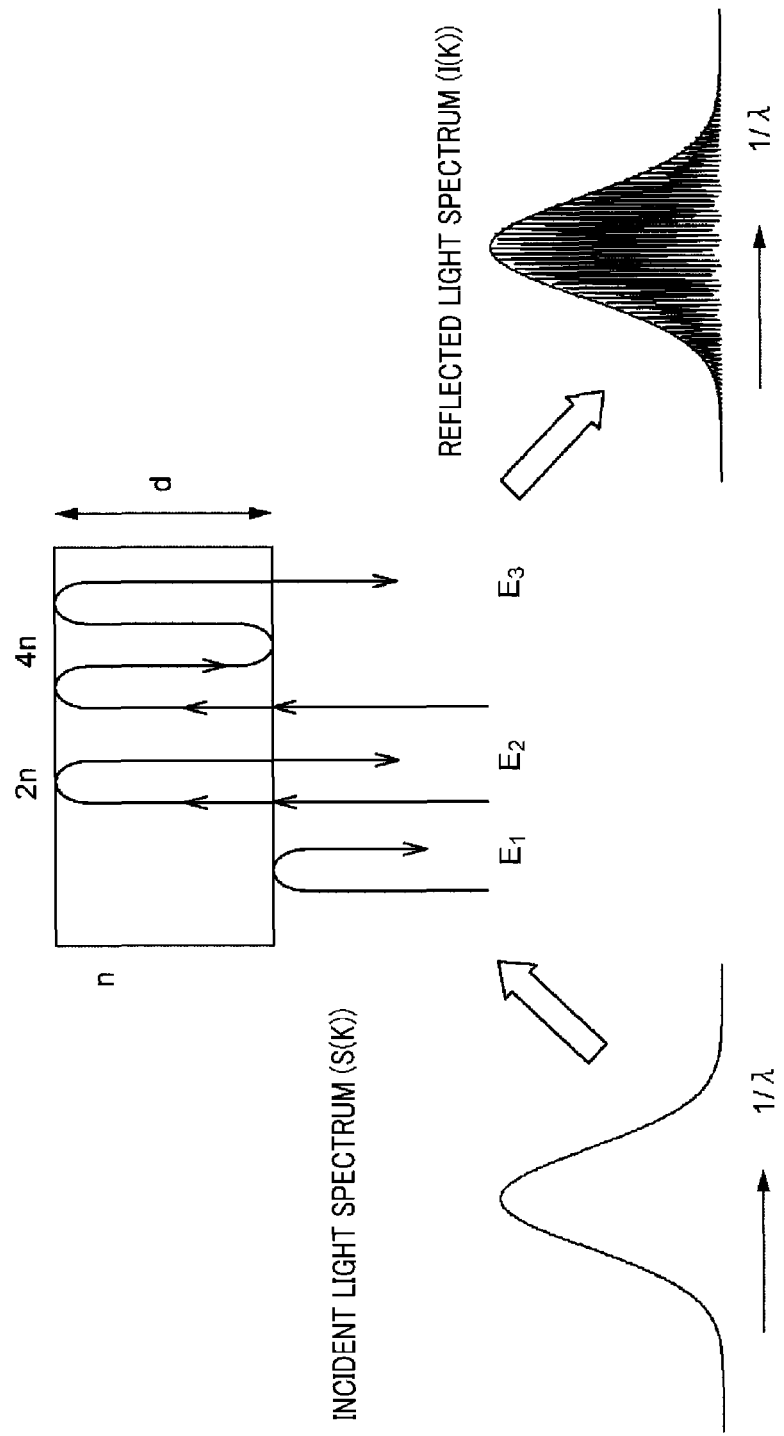
FIG. 3 is a schematic diagram for explaining an incident light spectrum and a reflected light spectrum.

FIG. 3 is a schematic diagram for explaining an incident light spectrum and a reflected light spectrum. As depicted in FIG. 3, the measurement light from the light source 10 is incident light. An intensity S(k) of the incident light spectrum is dependent upon a spatial frequency $1/\lambda$ (vibration number per unit length). Assuming that a wavelength of the light source 10 is λ, a wave number k is 2π/λ. A thickness of the measurement target object 13A is d, a refractive index is n, and a reflectance is R. A reflected light E is obtained by overlapping multiple reflected components. By way of example, $E_1$ is a reflected component from the front surface 13a, and $E_2$ is a reflected component from the rear surface 13b. $E_3$ is a component reflected once from the front surface 13a and twice from the rear surface 13b. Further, reflected components after $E_4$ are not shown here. By overlapping multiple reflected components, an intensity of I(k) of the reflected light spectrum is obtained. By way of example, considering the components $E_1$ and $E_2$ only, the intensity I of the reflected light spectrum can be represented by the following formula.

[Formula 1]

$$E = E_1 + E_2$$

$$I = |E|^2 = |E_1 + E_2|^2 = |E_1|^2 + |E_2|^2 + E_1^* E_2 + E_1 E_2^*$$

Herein, third and fourth terms of the intensity I of the reflected light spectrum are terms relating to interference between a front surface and a rear surface. As described above, the interference between a front surface and a rear surface is measured as a product of the reflected component from the front surface 13a and the reflected component from the rear surface 13b. As a result, if any one reflection from the front surface 13a and the rear surface 13b is small, it is difficult to measure interference. Further, considering multiple-reflection, the intensity I(k) of the reflected light spectrum has a relationship represented by the following formula with respect to the intensity S(k) of the incident light spectrum.

[Formula 2]

$$I(k) \propto \{2R(1-R) - 2R(1-2R)\cos(2nkd) - 2R^2 \cos(4nkd)\} S(k) \quad (1)$$

In Equation (1), a second term is a term relating to interference between a front surface and a rear surface. A third term is a term relating to multiple-interference between a front surface and a rear surface. When Equation (1) is Fourier transformed, a reflected light spectrum depending on a position can be obtained.

Figure 4:
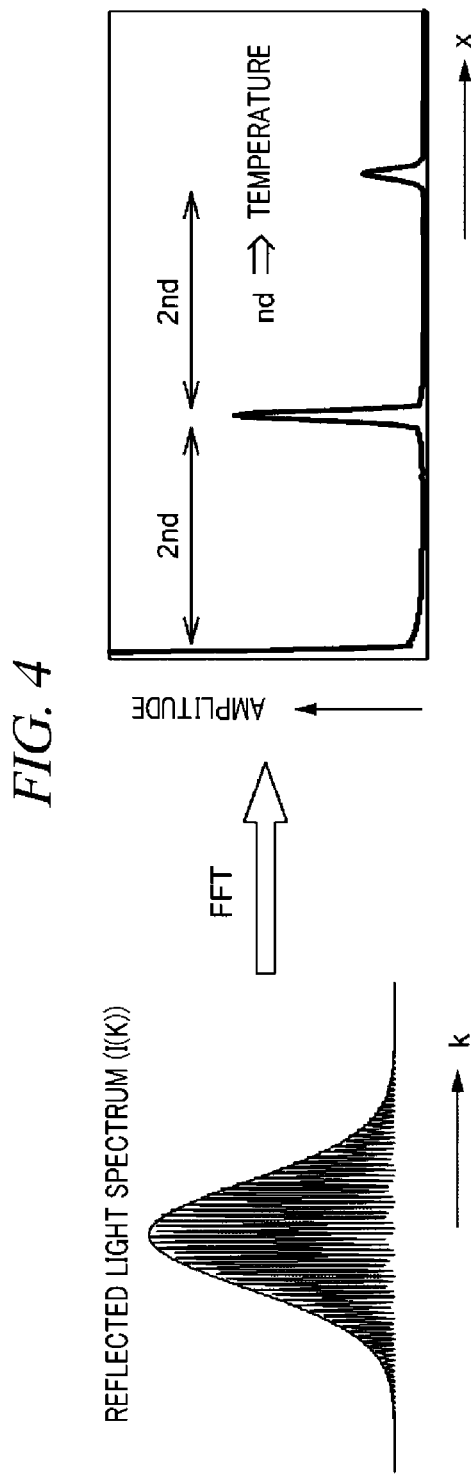
FIG. 4 is a schematic diagram for explaining Fourier transform of a reflected light spectrum.

FIG. 4 is a schematic diagram for explaining Fourier transform of the reflected light spectrum I(k). As depicted in FIG. 4, by the spatial domain Fourier transform, the spatial frequency 1/λ is transformed to a position x. An intensity I(x) of the reflected light spectrum that is transformed to the position x is as follows by performing Fourier transform of Equation (1).

[Formula 3]

$$I(x) = 2R(1-R) \cdot S(x) - R(1-2R) \cdot \{S(x+2nd) + S(x-2nd)\} - R^2 \cdot \{S(x+4nd) + S(x-4nd)\} \quad (2)$$

As shown in Equation (2), a peak value appears at each 2nd. Herein, 2nd is a difference between optical paths of a front surface and a rear surface. That is, n·d is an optical path length between the front surface and the rear surface. A temperature can be calculated by determining the optical path length nd in a previously measured relationship between the optical path length nd and the temperature. Further, in the above description, the spatial contain Fourier transform is used. However, a time domain Fourier transform may foe used. When a frequency is v, the position x satisfies the following relationship.

[Formula 4]

$$2\pi \cdot v \cdot t = 2\pi \cdot \frac{v}{c} \cdot ct = 2\pi \cdot \frac{1}{\lambda} \cdot x$$

Herein, a difference between a case where a thickness of a measurement target object is measured and a case where a temperature of a measurement target object is measured by using the FFT frequency domain method will be described. Generally, a thickness of a measurement target object to be measured by the FFT frequency domain method can be measured with an accuracy of several hundreds of μm order. However, when measuring a temperature by 1° C., an accuracy of several hundreds of Å order is needed. That is, it is difficult to use a thickness measuring system simply as a light interference system, and it is required to measure a temperature by using devices, e.g., a light source, a spectrometer and the like, each of which satisfies certain conditions. Hereinafter, conditions of the respective components will be described.

Figure 5:
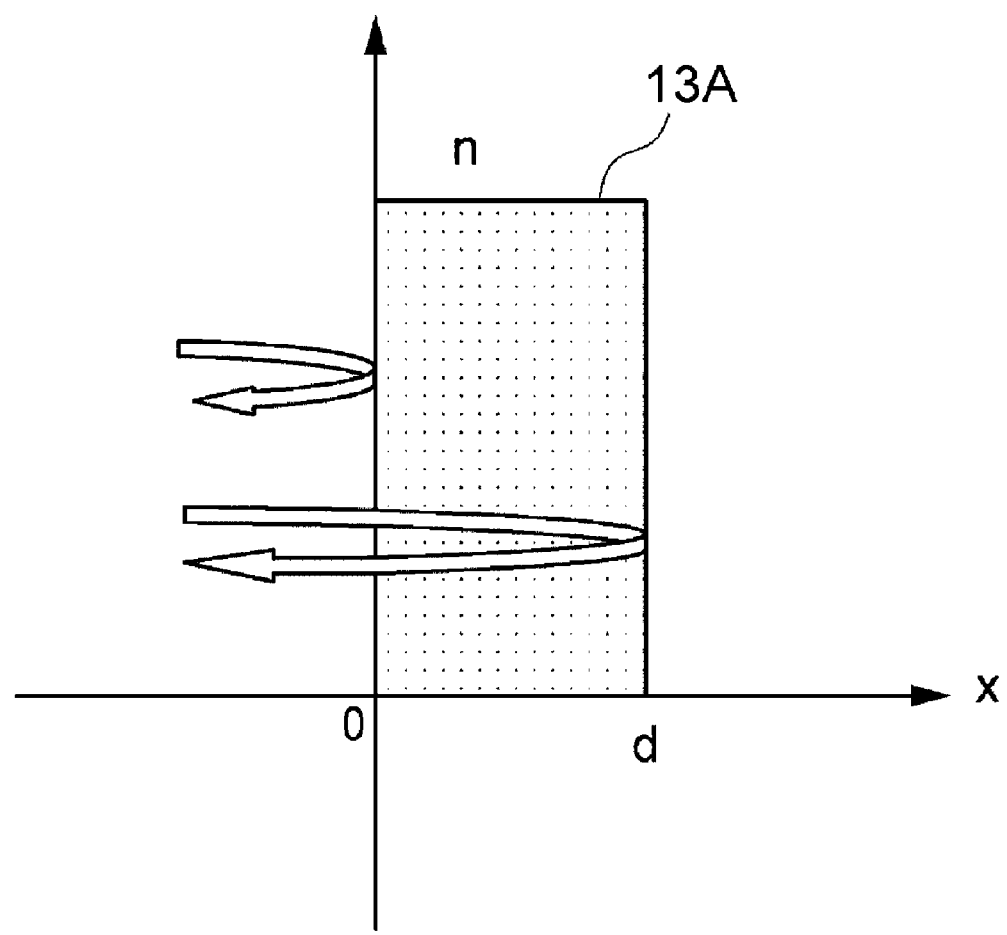
FIG. 5 is a schematic diagram for explaining a maximum measurement thickness.

First, a maximum thickness capable of being measured by the light interference system 1 (maximum measurement thickness) and data intervals after the Fourier transform of the reflected light spectrum will be described. FIG. 5 is a schematic view that explains a reflected light. As depicted in FIG. 5, in the measurement target object 13A having a thickness d and a refractive index n, a position of the front surface of the measurement target object 13A is 0 and a position of the rear surface of the measurement target object 13A is x. Here, a relationship between time Δτ and an angular frequency Δω in FFT is represented by the following formula.

[Formula 5]

$$\Delta \tau = \frac{2\pi}{\Delta \omega} \quad (3)$$

Herein, the angular frequencies ω and Δω are represented in terms of a wavelength λ and a half width at half maximum Δλ of a light source spectrum as follows.

[Formula 6]

$$\omega = 2\pi \cdot v = 2\pi \frac{c}{\lambda}, \quad \Delta \omega = -2\pi \cdot \frac{c}{\lambda^2} \Delta \lambda \quad (4)$$

Since the frequencies are positive values, the following equation is satisfied.

[Formula 7]

$$\Delta \omega = -2\pi \cdot \frac{c}{\lambda^2} \cdot \Delta \lambda \Rightarrow 2\pi \cdot \frac{c}{\lambda^2} \cdot \Delta \lambda \quad (5)$$

Therefore, the following equation can be obtained.

[Formula 8]

$$\Delta \tau = \frac{2\pi \cdot \lambda^2}{2\pi \cdot c \cdot \Delta \lambda} = \frac{\lambda^2}{c \cdot \Delta \lambda} \quad (6)$$

Assuming that a distance at which a light travels for the time $\Delta\tau$ in the measurement target object 13A having the refractive index n (average refractive index $n_{ave}$) is $\Delta x'$, the distance $\Delta x'$ is represented by the following formula by using Equations (3) and (5).

[Formula 9]
$$\Delta x' = \frac{c}{n_{ave}} \cdot \Delta\tau = \frac{\lambda^2}{n_{ave} \cdot \Delta\lambda} \quad (7)$$

Since the light is transmitted through the front surface and then is reflected from the rear surface, the distance $\Delta x'$ is $2\Delta x$ in consideration of a reciprocating distance. According to the above equation, data interval $\Delta x$ in the reflected light spectrum after the FFT is represented by the following formula.

[Formula 10]
$$\Delta x = \frac{c}{2 \cdot n_{ave}} \cdot \Delta\tau = \frac{\lambda^2}{2 \cdot n_{ave} \cdot \Delta\lambda} \quad (8)$$

In the frequency domain method, an actual spectrum intensity I(k) is a discrete value of the number of samplings $N_s$ in a wavelength axis direction. Therefore, the data after the FFT is $N_s/2$ discrete data at an interval $\Delta x$. Therefore, a maximum optical measurement thickness $x_{max}$ can be represented by the following formula.

[Formula 11]
$$x_{max.} = \frac{\lambda^2}{2n_{ave} \cdot \Delta\lambda} \cdot \frac{N_S}{2} = \frac{\lambda^2}{4\pi_{ave} \cdot \Delta\lambda} \cdot N_3 \quad (9)$$

This is a value of a coordinate in an actual space, and the data of the spectrum sifter the FFT becomes a product of $2n_{ave}$ of this value. Therefore, in the space after the FFT, the maximum optical measurement thickness $x_{max}$ and the data interval $\Delta x$ can be represented by the following formulas.

[Formula 12]
$$X_{max} = 2 \cdot n_{ave} \cdot x_{max} = \frac{\lambda^2}{2 \cdot \Delta\lambda} \cdot N_x \quad (10)$$

[Formula 13]
$$\Delta X = 2 \cdot n_{ave} \cdot \Delta x = \frac{\lambda^2}{\Delta\lambda} \quad (11)$$

The above equations are general equations that are not affected by a refractive index of a medium and that are determined only by conditions of a measuring system. In an actual measuring system, since $\Delta\lambda$ can be considered as a minimum period of the FFT, herein, $\Delta\lambda$ may be considered as a measured wavelength range or a wavelength scan range of the spectrometer. Assuming that the wavelength span is $\Delta w$ and a central wavelength of the spectrometer is $\lambda_0$, Equations (10) and (11) can be represented as follows.

[Formula 14]
$$X_{max} = \frac{\lambda_0^2}{2 \cdot \Delta w} \cdot N_y \quad (12)$$

[Formula 15]
$$\Delta X = \frac{\lambda_0^2}{\Delta w} \quad (13)$$

Therefore, when the wavelength range $\Delta w$ of the spectrometer is increased, the data interval $\Delta x$ after the FFT can be reduced. Further, when the number of samplings $N_s$ is increased, a thicker medium can be measured. Accordingly, it can be seen that reducing of the data interval and increasing of the measurable thickness are not compatible with each other. The above equations are general equations that are not affected by a refractive index. Therefore, when the above equations are converted into actual scales in the medium having the refractive index $n_{ave}$, the respective equations are divided by $2n_{ave}$.

Figure 6A:
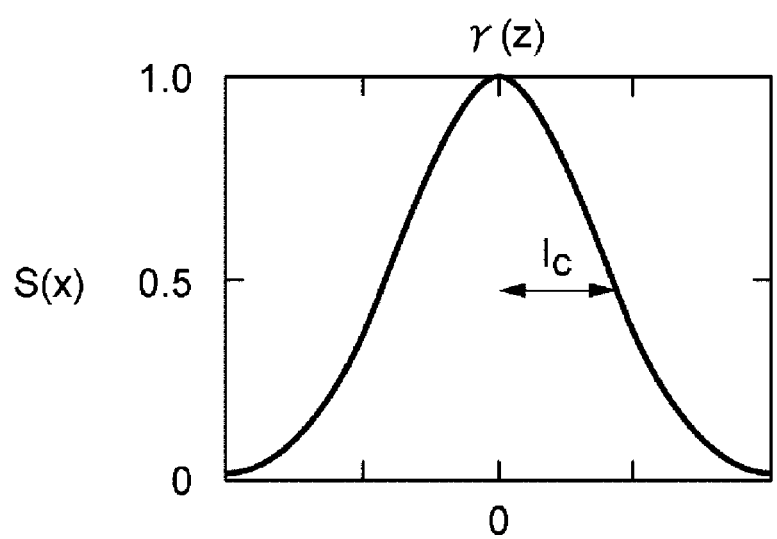
FIGS. 6A and 6B are schematic diagrams for explaining a minimum spatial resolution, and to be specific.
Figure 6B:
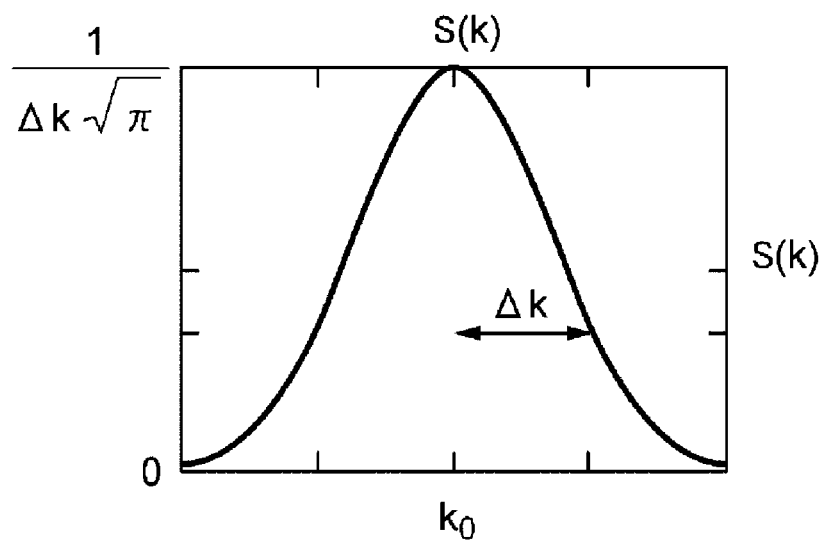

Hereinafter, a minimum spatial resolution will be described. FIGS. 6A and 6B are schematic diagrams for explaining a minimum spatial resolution. FIG. 6B shows a spectrum of an intensity distribution depending on a wave number (k) of the light source, which can be approximated by a Gaussian function. An intensity S(k) of the spectrum shown in FIG. 6B can be represented by the following equation when a wave number of a peak value is $k_0$, an intensity of the peak value is $1/[\Delta k \cdot (\pi)^{1/2}]$, and a half width at half maximum is $\Delta k$.

[Formula 16]
$$S(k) = \frac{1}{\Delta k \sqrt{\pi}} \cdot \exp\left[-\left(\frac{k - k_0}{\Delta k}\right)^2\right] \quad (14)$$
$$= \frac{1}{\Delta k \sqrt{\pi}} \cdot \exp\left[-\left(\frac{k - k_0}{\Delta k'}\right)^2 \cdot \ln 2\right]$$

Further, the relationship satisfies the following equation.

[Formula 17]
$$\Delta k = \frac{\Delta k'}{\sqrt{\ln 2}} \quad (15)$$

Furthermore, the relationship satisfies the following equation.

[Formula 18]
$$k = \frac{2\pi}{\lambda} \rightarrow \Delta k = \frac{2\pi}{\lambda^2} \cdot \Delta\lambda \quad (16)$$

By using Equations (15) and (16), the half width at half maximum $\Delta k$ can be represented by the following equation.

[Formula 19]
$$\Delta k = \frac{2\pi \cdot \Delta\lambda}{\lambda^2 \sqrt{\ln 2}} \quad (17)$$

Meanwhile, when the spectrum of FIG. 6B is transformed by the FFT, a spectrum of FIG. 6A is obtained. FIG. 6A shows the spectrum of a Gaussian function representing an intensity distribution depending on a position x. An intensity S(x) of the spectrum of FIG. 6A can be represented by the following equation when a position of a peak value is 0 and an intensity of a peak is 1.

[Formula 20]
$$S(x) = \exp(-x^2 \cdot \Delta k^2) = \exp\left[-\left(\frac{x}{\Delta x'_y}\right)^2 \cdot \ln 2\right] \quad (18)$$

Further, the half width at half maximum $\Delta k$ of a wavelength domain spectrum and a half width at half maximum $\Delta x_g$ of S(x) of a spatial domain spectrum have a relationship represented by the following equation.

[Formula 21]
$$\Delta k^2 = \frac{\ln 2}{\Delta x_s^2} \quad (19)$$

When a half width at half maximum is $I_c$, the half width at half maximum $\Delta x_g$ of S(x) can be represented by the following equation based on Equation (19).

[Formula 22]
$$\Delta x_g = \frac{\sqrt{\ln 2}}{\Delta k} = \frac{\ln 2}{2\pi} \cdot \frac{\lambda^2}{\Delta \lambda} = \frac{l_c}{2} \quad (20)$$

The half width at half maximum $I_c$ of the spectrum having the intensity S(x) becomes a coherence length. The minimum spatial resolution is $I_c$, and $I_c$ is determined based on a central wavelength and a half width at half maximum of spectrum of the light source 10.

Then, a condition about the number of samplings $N_s$ required for the spectrometer 14 will be derived based on the above-described maximum optical measurement thickness $x_{max}$. Assuming that a central wavelength of the light source 10 is $\lambda_0$, a half width at half maximum of the light source spectrum is $\Delta \lambda$, a wavelength span of the spectrometer 14 is $\Delta w$, and a refractive index of the measurement target object 13A is n, the maximum optical measurement thickness $x_{max}$ can be represented by the following equation based on Equation (9).

[Formula 23]
$$x_{max} = \frac{\lambda_0^2}{4 \cdot n \cdot \Delta w} \cdot N_s \quad (21)$$

Here, a maximum measurement thickness d and the maximum optical measurement thickness $x_{max}$ are required to satisfy the following condition.

[Formula 24]
$$d < x_{max} = \frac{\lambda_0^2}{4 \cdot n \cdot \Delta w} \cdot N_s \quad (22)$$

That is, the number of samplings $N_s$ satisfying the following relationship is needed.

[Formula 25]
$$N_s > \frac{4 \cdot n \cdot d \cdot \Delta w}{\lambda_0^2} \quad (23)$$

By way of example, if the maximum measurement thickness d is 0.775 mm, the central wavelength $\lambda_0$ of the light source 10 is 1550 nm, and the refractive index n of the measurement target object 13A is 3.7, the following formula is obtained.

[Formula 26]
$$\frac{\Delta w}{N_s} < 2 \times 10^{-10} \quad (24)$$

Further, when the wavelength span $\Delta w$[m] is converted into $\Delta w'$[nm], the following formula is obtained.
[Formula 27]
$$\Delta w'[\text{nm}] = 0.2 N_s \quad (25)$$

The light interference system 1 includes the spectrometer 14 having the wavelength span $\Delta w'$[nm] and the number of samplings $N_s$ satisfying in equation (25). By way of example, when the wavelength span $\Delta w'$[nm] is 40 nm, the number of samplings $N_s$ is greater than 200. That is, when the wavelength span $\Delta w'$[nm] is 40 nm, the light receiving unit 142 in which more than 200 light receiving devices are arranged is needed.

Figure 7A:
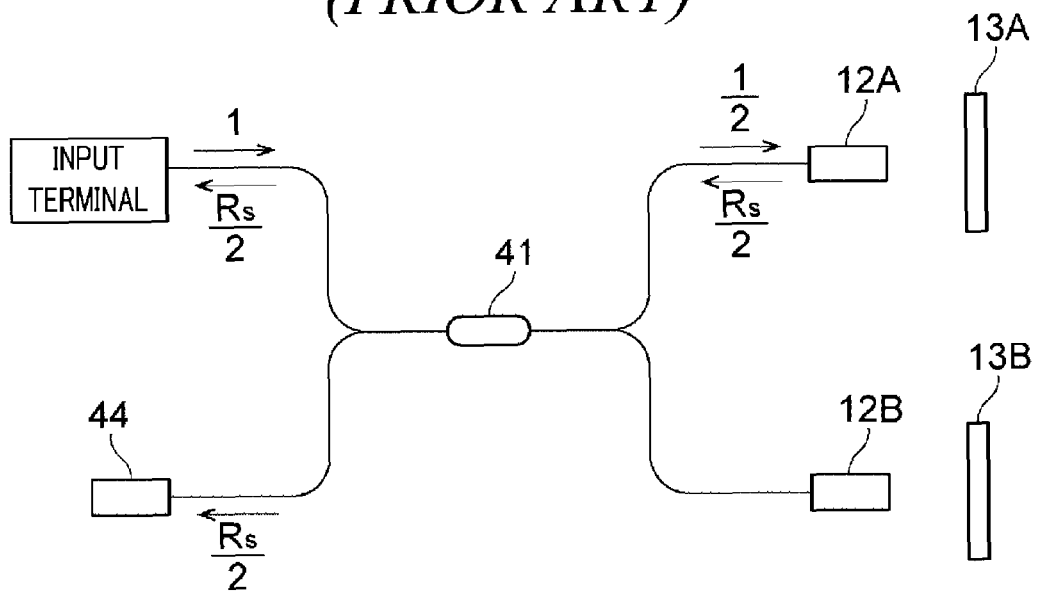
FIGS. 7A and 7B are schematic diagrams for explaining light loss of a light interference system, and to be specific.
Figure 7B:
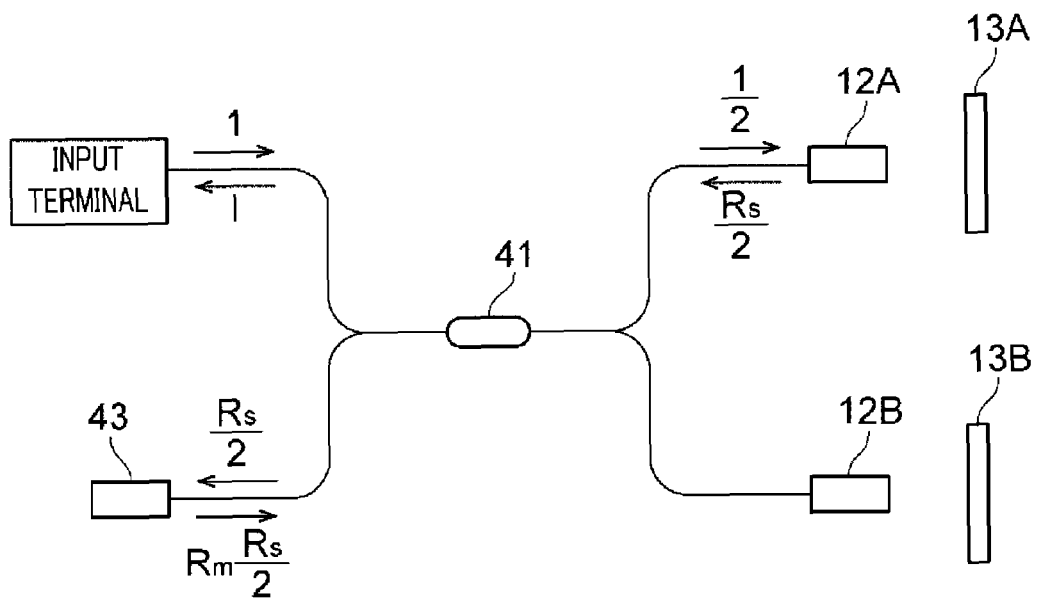

Hereinafter, there will be explained an operation of improving an intensity of a photo coupler in accordance with the present illustrative embodiment. FIGS. 7A and 7B are model diagrams of couplers having two input terminals and two output terminals. FIG. 7A is a model diagram of a conventional light interference system, and FIG. 7B is a model diagram of a light interference system in accordance with the illustrative embodiment.

There will be first explained an intensity (quantity of light) of a reflected light returning back to input terminals of a conventional light interference system. As shown in FIG. 7A, in the conventional light interference system, an input terminal (return terminal) of a coupler is terminated by a cap 44 on which an antireflection process is performed. Herein, when the quantity of light introduced through an input terminal is 1, a refractive index of the measurement target object 13A is n, and a reflectance is $R_s$, the quantity of light returning to the respective input terminals can be represented by the following equation.

[Formula 28]
$$I = \frac{1}{2} \cdot \left(\frac{1-n}{1+n}\right)^2 = \frac{R_s}{2} \quad (26)$$

By way of example, if the measurement target object 13A is a made of Si and the refractive index n is 3.7, the reflectance $R_s$ is 0.33, and a quantity of light I becomes 0.165 according to Equation (26).

Hereinafter, there will be explained a quantity of light of a reflected light returning back to an input terminal of a light interference system in accordance with the illustrative embodiment. As depicted in FIG. 7B, in the light interference system in accordance with the illustrative embodiment, the mirror 43 is provided at an input terminal (return terminal) of a coupler. Further, in the drawing, a collimator is omitted. Herein, when the quantity of light introduced through the input terminal is 1, a reflectance of the measurement target object 13A is $R_s$, and a reflectance of the mirror 43 is $R_m$, the quantity of light returning to the respective input terminals can be represented by the following equation.

[Formula 29]

$$I = \sum_{1}^{\infty} \left( \frac{R_s}{2} \cdot \left( R_m \cdot \frac{R_s}{2} \right)^{n-1} \right) \quad (27)$$

When Equation (27) is solved, the following equation can be obtained.

[Formula 30]

$$I = \frac{\frac{R_s}{2}}{1 - R_m \cdot \frac{R_s}{2}} \quad (28)$$

By way of example, when the reflectance of the mirror is 0.9, the measurement target object 13A is made of Si, and the reflectance $R_s$ is 0.33, the quantity of light I becomes 0.194 according to Equation (28). Therefore, by reusing the return lights, the intensity is expected to be increased by about 17%.

In the same manner as described above, a coupler having N input terminals and N output terminals will be explained. N measurement target objects are provided at an output terminal side and the mirrors 43 having the reflectance $R_m$ are provided at (N−1) input terminals to face each other. Further, a reflectance of the measurement target object 13A is $R_s$. Furthermore, an intensity of an incident light is 1. In this case, a light intensity $I^1$ in a first reflection of each measurement target object can be represented by the following equation.

[Formula 31]

$$I^1 = 1 \cdot R_s \cdot \frac{1}{N} \quad (29)$$

According to Equation (29), a total light intensity $I_m^1$ in the first reflection of lights to be incident to the mirror 43 can be represented by the following equation.

[Formula 32]

$$I_m^1 = 1 \cdot R_s \cdot \frac{N-1}{N} \quad (30)$$

A second light having an intensity obtained when Equation (30) is multiplied by the reflectance $R_s$ of the mirror 43 is incident to the measurement target object. Therefore, a light intensity $I^2$ in a second reflection of each measurement target object can be represented by the following equation.

[Formula 33]

$$I^2 = 1 \cdot R_s \cdot \frac{N-1}{N} \cdot R_m \cdot R_s \cdot \frac{1}{N} \quad (31)$$

In the same manner as described above, a light intensity $I^n$ in a n-th reflection can be represented by the following equation.

[Formula 34]

$$I^n = \frac{R_s}{N} \cdot \left( R_s \cdot R_m \cdot \left( \frac{N-1}{N} \right) \right)^{n-1} \quad (32)$$

According to Equation (32), a total light intensity I of reflected lights can be represented by the following equation.

[Formula 35]

$$I = \sum_{n=1}^{\infty} \frac{R_s}{N} \cdot \left( R_s \cdot R_m \cdot \frac{N-1}{N} \right)^{n-1} = \frac{1}{1 - \left( R_s \cdot R_m \cdot \frac{N-1}{N} \right)} \quad (33)$$

As can be seen from Formula 35, as N is increased, the light intensity of reflected lights can be improved.

Figure 8:
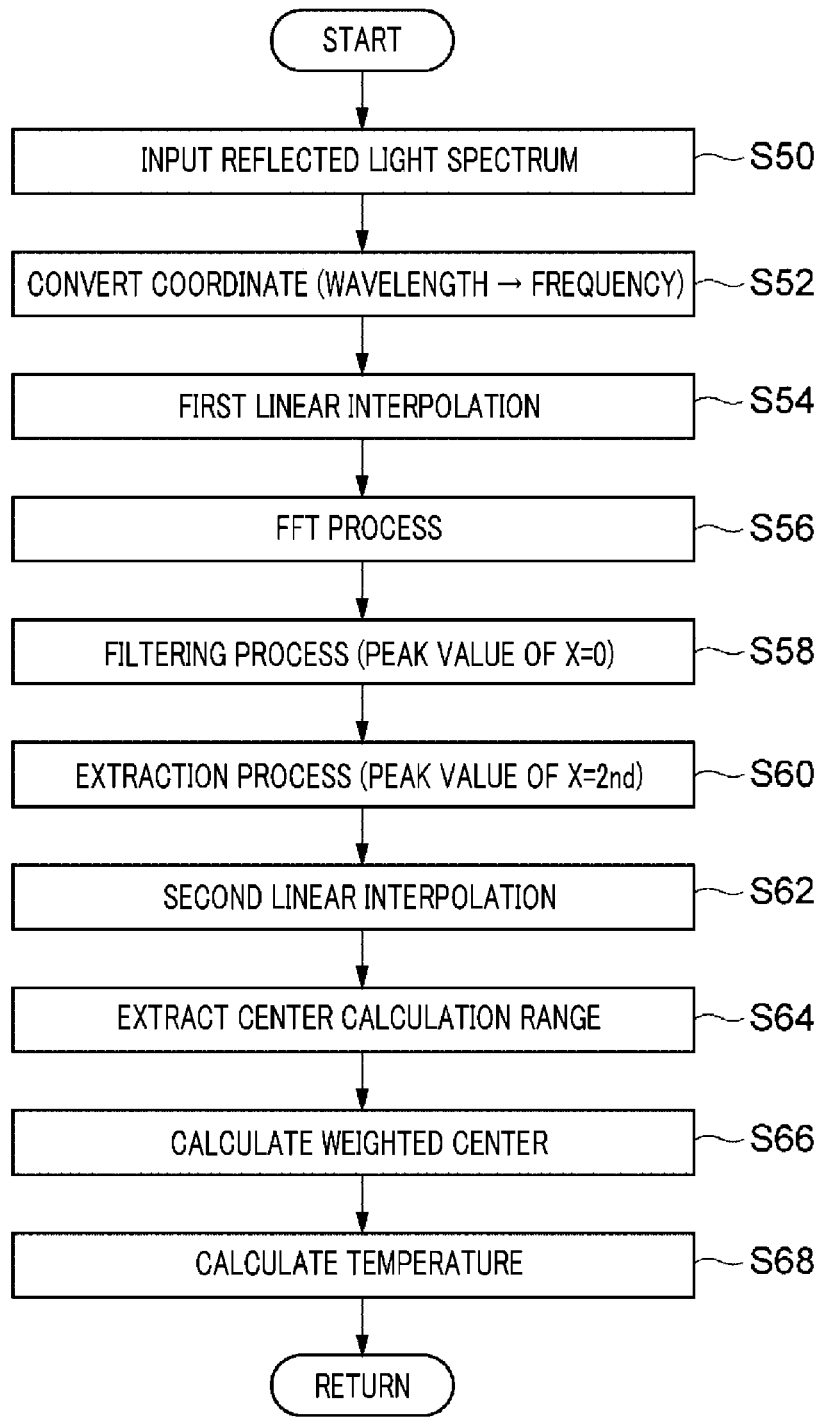
FIG. 8 is a flowchart showing a temperature measurement operation.

Hereinafter, a temperature measurement operation of the light interference system 1 will be explained. FIG. 8 is a flowchart showing an operation of the light interference system 1. Further, there will be explained an example where a Si wafer of 300 μm is used as the measurement target object 13A and a Si wafer of 770 μm is used as the measurement target object 13B.

Figure 9A:
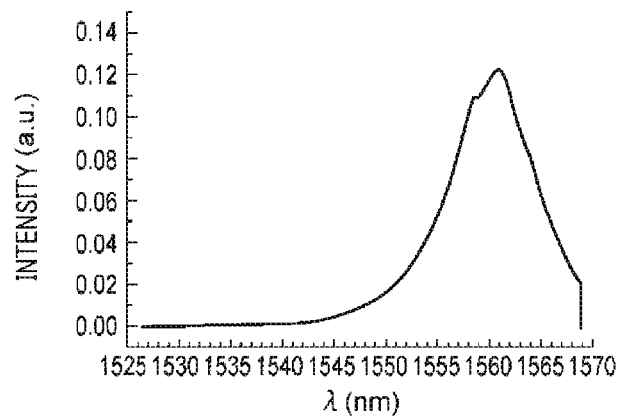
FIGS. 9A to 9C are graphs for explaining a temperature measurement operation, and to be specific.
Figure 9B:
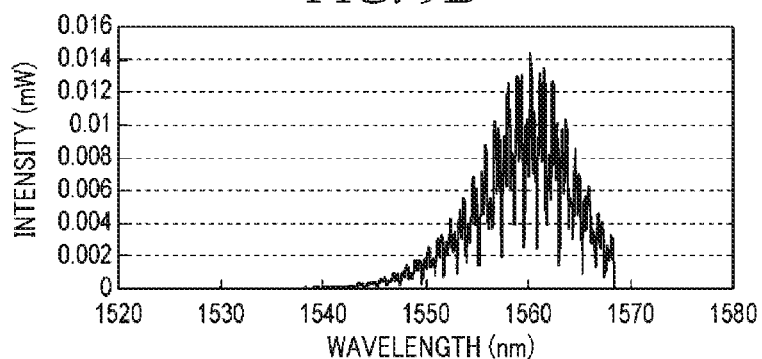

As depicted in FIG. 8, an input process of a reflected light spectrum starts (S50). The light source 10 generates a measurement light. By way of example, such measurement light has a spectrum shown in FIG. 9A. The spectrometer 14 acquires a spectrum of lights reflected from the front surfaces 13a and 13c and the rear surfaces 13b and 13d of the measurement target objects 13A and 13B. By way of example, such lights have a spectrum shown in FIG. 9B. The optical path length calculating unit 16 receives the reflected light spectrum from the spectrometer 14. When the process of S50 ends, the process proceeds to a coordinate converting process (S52).

In the process of S52, the optical path length calculating unit 16 converts a coordinate axis of the spectrum obtained from the process of S50 into a spatial frequency 1/λ from a wavelength λ. When the process of S52 ends, the process proceeds to a first data interpolation process (S54).

In the process of S54, the optical path length calculating unit 16 performs a data interpolation of the spectrum obtained from the process of S52. By way of example, the optical path length calculating unit 16 linearly interpolates the data. Further, by way of example, the number of samplings is $N_s$, spatial frequencies as data of the spectrum are arranged in an order of $x_0, x_1, x_2, \ldots, x_{N-1}$, and intensities are arranged in an order of $y_0, y_1, y_2, \ldots, y_{n-1}$. First, the optical path length calculating unit 16 rearranges the spatial frequencies at the same intervals. By way of example, assuming that a spatial frequency included in the rearranged spatial frequencies is $X_i$, the spatial frequencies are rearranged by using the following formula.

[Formula 36]

$$X_i = x_0 + \frac{x_{N-1} - x_0}{N_s - 1} \cdot i$$

Then, the optical path length calculating unit 16 calculates an intensity of the spatial frequency $X_i$ after the rearrangement by using the linear interpolation. Assuming that the intensity at that time is $Y_i$, $Y_i$ is calculated by using the following formula.

[Formula 37]

$$Y_i = \frac{y_{j+1} - y_j}{x_{j+1} - x_j} \cdot (X_i - x_j)$$

Herein, j is a maximum integer satisfying a condition of $X_i > x_j$. When the process of S54 ends, the process proceeds to a FFT process (S56).

Figure 9C:
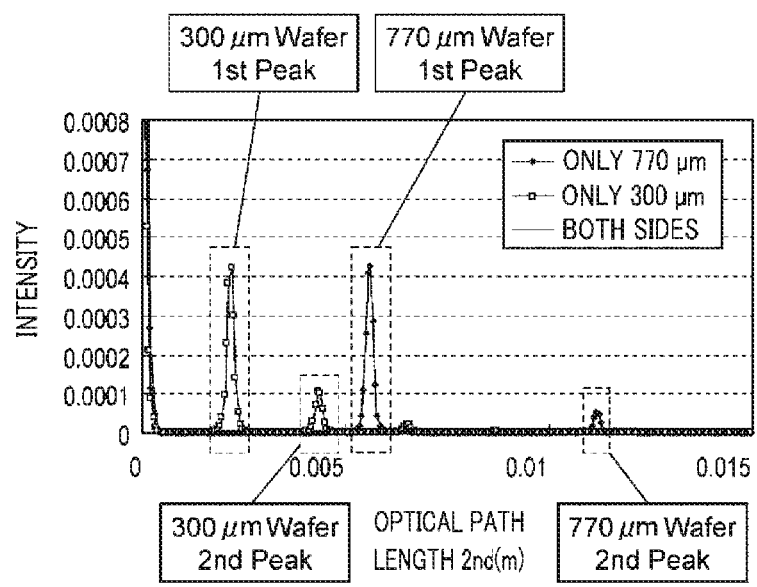

In the process of S56, the Fourier transform unit 17 performs Fourier transform of the spectrum that is interpolated in the process of S54. Accordingly, by way of example, as shown in FIG. 9C, a spectrum having a vertical axis denoting an amplitude and a horizontal axis denoting a phase is obtained. When the process of S56 ends, the process proceeds to a filtering process (S58).

In the process of S58, the optical path length calculating unit. 16 filters a peak value of X=0 from the spectrum obtained from the process of S56. By way of example, 0 is substituted for intensity data Y within a range of from X=0 to X=Z (preset value). When the process of S58 ends, the process proceeds to an extraction process (S60).

In the process of S60, the optical path length calculating unit 16 extracts a peak value of X=2nd from the spectrum obtained from the process of S58. By way of example, when a maximum value of the peak is $Y_i$, twenty data points are extracted from a value $Y_{i-10}$ in order to extract data from a center to an end of the peak. By way of example, when the maximum value of the peak is 1, data points are extracted in a range of from the maximum value to 0.5. Further, if there are multiple data points, a thickness estimate of a measurement target object is determined in advance and a position around which a peak appears is measured. By way of example, since the measurement target object 13A has a thickness of 300 μm and the measurement target object 13B has a thickness of 770 μm, positions where their peaks appear can be determined in an approximate range. Thus, even if there are multiple measurement points, a peak can be extracted appropriately. Further, a sub peak appears since the mirror 43 is provided. As described above, an approximate position of a peak signal having necessary information can be seen, and, thus, even if the mirror 43 is provided, a peak can be measured without being affected by the sub peak. When the process of S60 ends, to the process proceeds to a second data interpolation process (S62).

In the process of S62, the data interpolation unit 18 interpolates data of the peak of 2·n·d obtained from the process of S60 (data interpolation process). The data interpolation unit 18 linearly interpolates, for example, intervals between the data points at the same intervals by the number of interpolations $N_A$. The number of interpolations $N_A$ is set in advance based on, for example, required temperature accuracy.

Hereinafter, the number of interpolations $N_A$ will be described. By way of example, when the measurement target object 13A is a Si substrate having a radius of 300 mm, a peak interval Δ2nd after the FFT is 0.4 μm/° C. Therefore, when an accuracy of 1° C. is required, the number of interpolations $N_A$ is set such that a data interval becomes 0.4 μm. The number of interpolations $N_A$ may be determined in consideration of a noise level of the system. Herein, it is assumed that a wavelength span Δw is 42 nm and the number of samplings $N_s$ is 640 in the spectrometer 14. Further, it is assumed that a central wavelength $\lambda_0$ of the light source 10 is 1560 nm. In this case, the data interval Δx after the FFT becomes 56 nm by using Equation (8). Therefore, each of the intervals between the points needs to be interpolated into 140 points (the number of interpolation $N_A$=140) such that the data interval becomes 0.4 μm. Furthermore, if the noise level is about 0.1° C., a resolution of 0.1° C. or less is not needed. Moreover, the data interpolation is important in that the resolution becomes 140° C. when the data interval Δx is 56 nm. By way of example, the data interpolation is performed by using the following formula.

[Formula 38]

$$Y_i = (y_{j+1} - y_j) \cdot \frac{X_i - X_j}{X_{j+1} - X_j}$$

Herein, j is the index used to arrange the intensities. The data interpolation unit 18 executes Equation (32) within a range of i=0 to N−1. That is, the data interpolation is performed with respect to all of the intervals between the 20 data points obtained from the process of S60. As described above, the data interval after the Fourier transform is divided into a required division number (the number of interpolation N), and then, the number of data according to the number of divisions is linearly interpolated. When the process of S62 ends, the process proceeds to an extraction process (S64).

In the process of S64, the center calculating unit 19 only extracts a data range used in calculating the center from the data interpolated in the process of S62. By way of example, the center calculating unit 19 substitutes 0 for intensity data Y that is equal to or less than the maximum intensity $Y_{MAX} \times A$ of the peak by setting a threshold value used in calculating the center to be A %. When the process of S64 ends, the process proceeds to a center calculation process (S66).

In the process of S66, the center calculating unit 19 calculates a weighted center from the data interpolated in the process of S64. By way of example, the following formula is used.

[Formula 39]

$$2 \cdot n \cdot d = \frac{\sum_{i=1}^{N}(Y_i \cdot X_i)}{\sum_{i=1}^{N} Y_i}$$

Further, N denotes the number of data points after extracting the central range. Thus, the optical path length nd can be calculated. When the process of S66 ends, the process proceeds to a temperature calculation process (S68).

Figure 10:
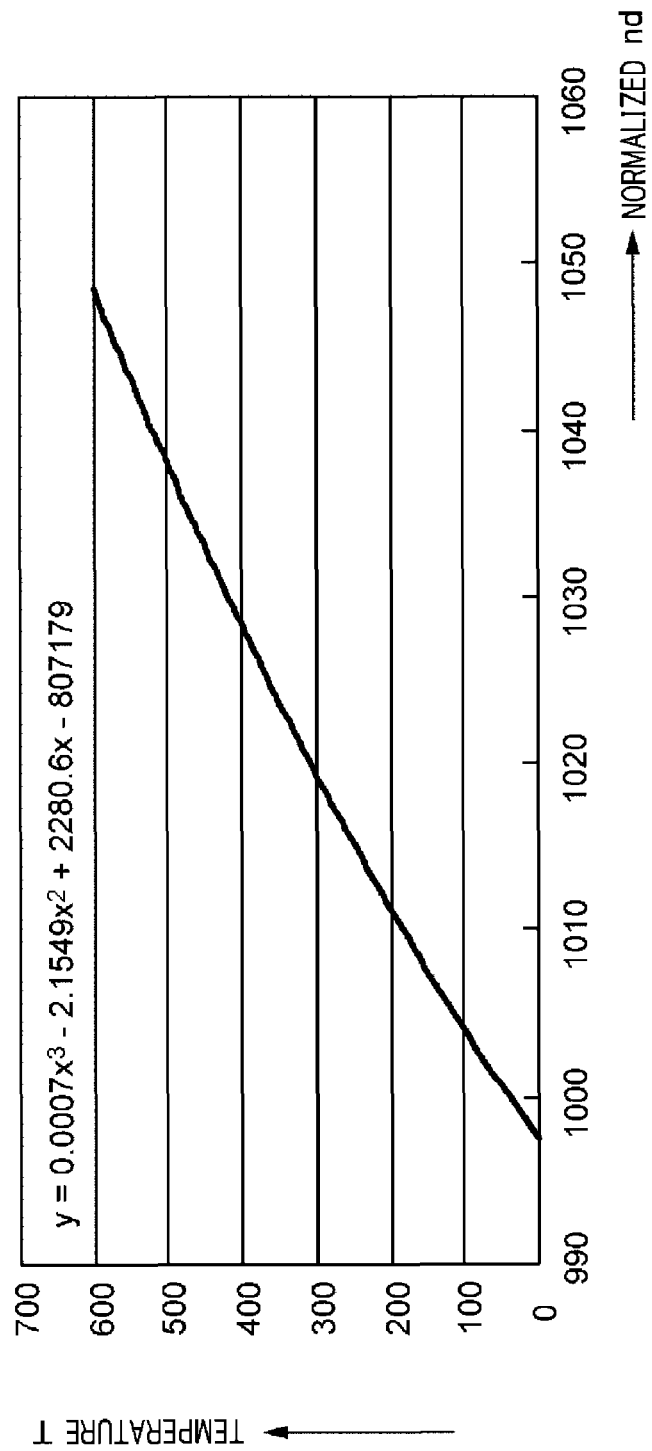
FIG. 10 shows an example of temperature correcting data.

In the process of S68, the temperature calculating unit 20 calculates a temperature by using the optical path length nd obtained from the process of S66. The temperature calculating unit 20 calculates a temperature by using, for example, the temperature correcting data 21 shown in FIG. 10. In FIG. 10, a horizontal axis denotes the optical path length nd, and a vertical axis denotes the temperature. The temperature correcting data 21 are acquired in advance with respect to each of the measurement target objects 13A and 13B. Hereinafter, an example of creating the temperature correcting data 21 in advance will be described. By way of example, temperatures are actually measured by using a blackbody furnace. Temperatures T and optical path lengths $nd_T$ corresponding to the temperatures T are simultaneously measured. The temperatures T are measured by using a thermometer such as a thermocouple. Further, the optical path lengths $nd_T$ are measured by using the above-described method of using the FFT. Furthermore, the optical path lengths $nd_T$ are normalized under a condition where an optical path length $nd_{40}$ when a value measured by the thermometer is 40° C. is 1000. Moreover, the temperature and the normalised optical path length $nd_T$ are approximated at every 100° C. to a cubic equation to derive a coefficient of an approximate curve. An equation shown on an upper left side of FIG. 10 is the cubic equation. Further, a function of the normalized opt real path lengths $nd_T$ depending on the temperatures T is represented by the following formula.

[Formula 40]

$$f(T) = \frac{n \cdot d_T}{n \cdot d_{40}}$$

Further, a inverse function of f(T) is represented as follows.

[Formula 41]

$$T = f^{-1}\left(\frac{n \cdot d_T}{n \cdot d_{40}}\right) \quad (34)$$

The optical path length $nd_{40}$ is calculated by the following equation based on an initial temperature T0 and an optical path length $nd_{T0}$ that time.

[Formula 42]

$$n \cdot d_{40} = \frac{n \cdot d_{T0}}{f(T0)} \quad (35)$$

Based on the optical path length $nd_{40}$ obtained from Equation (35) and the optical path length $nd_T$, the temperature T is calculated by using Equation (34). When the process of S68 ends, the control process shown in FIG. 8 ends.

As described above, the control process shown in FIG. 8 ends. By performing the control process shown in FIG. 8, a temperature can be measured with high accuracy even when there is a small amount of data points. Further, since data points can be interpolated according to a temperature accuracy, a temperature measurement can be performed accurately and stably.

As described above, in the light interference system 1 in accordance with the illustrative embodiment, if lights return from the multiple output terminals to the multiple input terminals except the first input terminal connected to the light source 10 and the spectrometer 14, the return lights are transmitted again to the multiple output terminals by the collimator 42 and the mirror 43 serving as a transmission device. However, in the conventional light interference system, if the coupler is used, an intensity of return lights is reduced to 1/N and an intensity loss of (1−N)/N is generated. In this regard, in the light interference system 1 in accordance with the illustrative embodiment, an input terminal, which is not used at the time of measurement, is not terminated by an antireflection process but transmits return lights again toward a measurement target object to be used. Therefore, the quantity of light of the return lights to the first input terminal can be increased. Accordingly, it is possible to improve a measurement accuracy.

Further, the above-described illustrative embodiment illustrates an example of a light interference system, and the devices and the methods of the illustrative embodiment may be modified or may be applied to other examples.

Figure 11:
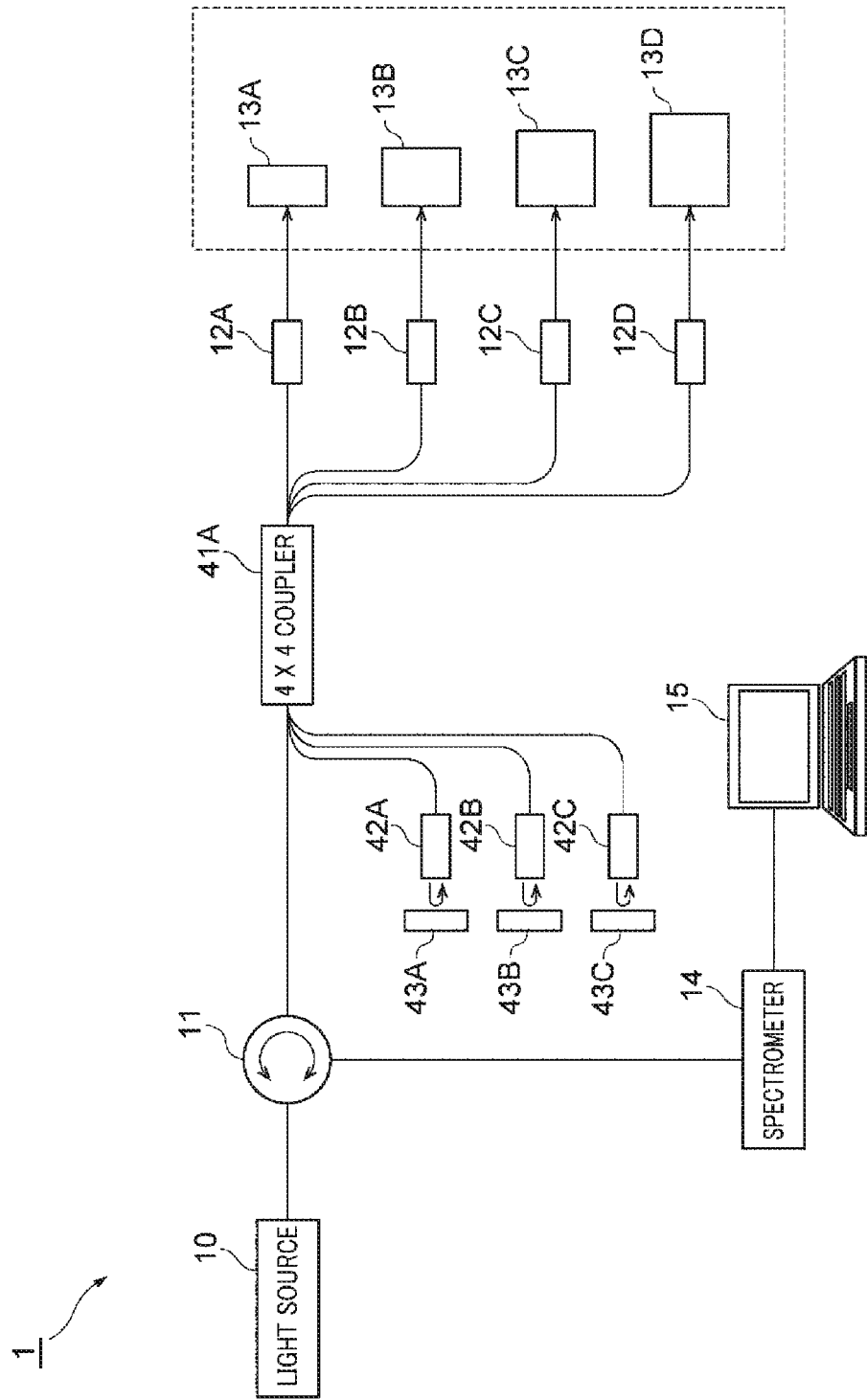
FIG. 11 is a schematic diagram of a modification example of the light interference.

By way of example, in the above-described illustrative embodiment, the coupler 41 has the two input terminals and the two output terminals. However, a coupler having N input terminals and N output terminals may be used. By way of example, as depicted in FIG. 11, the light interference system 1 may include a coupler 41A having four input terminals and four output terminals. In this case, measurement lights are emitted toward measurement target objects 13A to 13D from collimators 12A to 12D. Herein, transmission devices (collimators 42A to 42C and mirrors 43A to 43C) are provided at three input terminals of the coupler 41A. Therefore, in the same manner as the light interference system 1 shown in FIG. 1, it is possible to improve a measurement accuracy. Further, the number of measurement points can be increased as long as peaks after the FFT are not overlapped with each other, and the number of measurement points can be determined by a wavelength Δλ of the light source and a half width at half maximum $I_c$.

Figure 12:
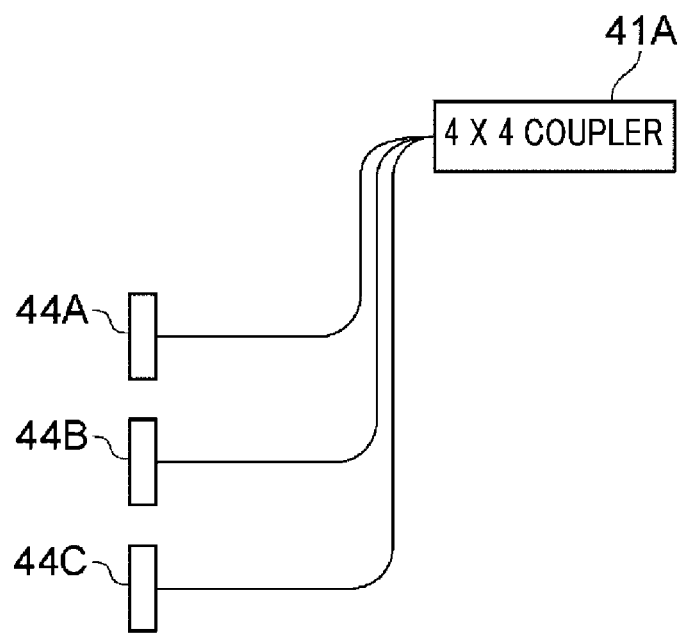
FIG. 12 shows a modification example of the coupler depicted in FIG. 1.
Figure 13:
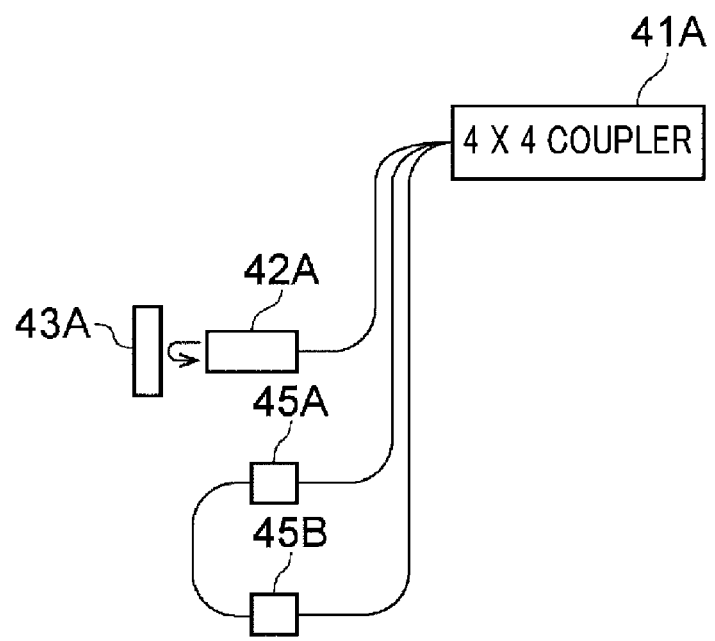
FIG. 13 shows a modification example of the coupler depicted in FIG. 1.

The transmission devices are not limited to the collimator and the mirror as depicted in FIGS. 1 and 11. By way of example, as depicted in FIG. 12, internally mirror-coated caps 44A to 44C may be provided directly at optical fibers or front ends of the optical fibers may be mirror-coated. Further, as depicted in FIG. 13, input terminals may be connected by connection units 45A and 45B by using optical fibers. In this case, there is no need to consider a reflection loss, and, thus, it is possible to further increase a light intensity. Further, as depicted in FIG. 13, transmission devices having different configurations may be used together.

Figure 14:
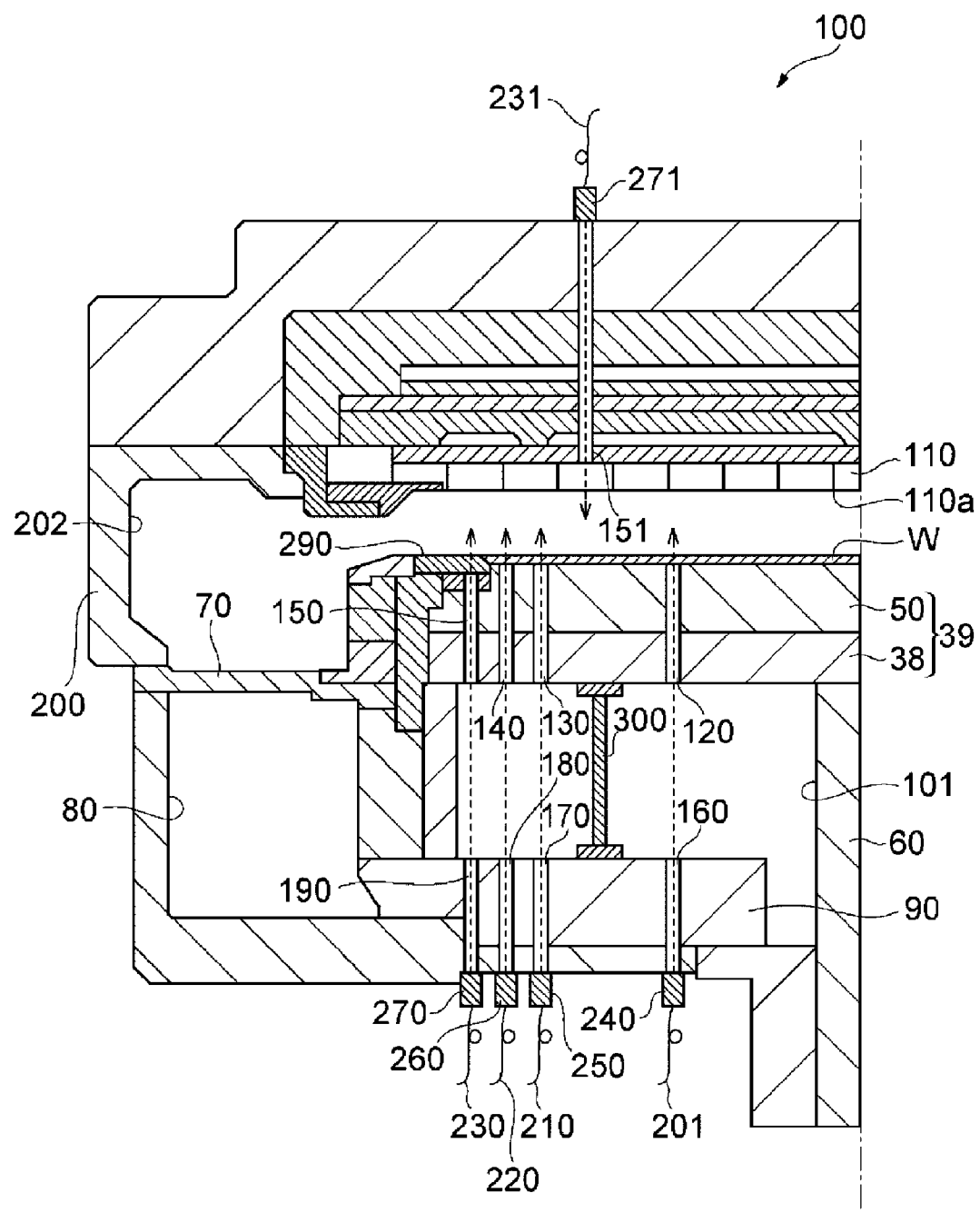
FIG. 14 shows an example of a substrate processing apparatus in accordance with an illustrative embodiment.

Further, the light interference system 1 explained with reference to the illustrative embodiment may be provided in a substrate processing apparatus. FIG. 14 schematically illustrates a longitudinal cross sectional view of main parts of a substrate processing apparatus 100. Herein, there will be explained an application example for measuring a temperature of a wafer, a focus ring or a facing electrode (upper electrode) as the measurement target objects 13A and 13B in a substrate processing apparatus such as a plasma etching apparatus.

As depicted in FIG. 14, the substrate processing apparatus 100 includes a vacuum chamber 200 that accommodates therein a semiconductor wafer W as a substrate and processes the semiconductor wafer W with plasma.

In the vacuum chamber 200, a processing chamber 202 is partitioned and provided. The processing chamber 202 as configured to be evacuated. In the processing chamber 202, there is provided a mounting table 39 configured to mount the semiconductor wafer W thereon. The mounting table 39 is made of a conductive material. Further, the mounting table 39 includes a RF plate 38 to which a high frequency power 4 is applied; and an electrostatic chuck 50 provided on the RF plate 38 and configured to attract the semiconductor wafer W.

A central part of the RF plate 38 is connected to a power supply rod 60 electrically connected to a high frequency power supply (not illustrated).

Around the mounting table 39, a baffle plate 70 is annularly provided to surround the mounting table 39. Under the baffle plate 70, there is formed an annular evacuation space 80 for uniform evacuation around the mounting table 39. Further, at a bottom part of the vacuum chamber 200, a base plate 90 is provided. Between the RF plate 38 and the base plate 90, a cavity 101 is formed. This cavity 101 has an area sufficient to insulate the RF plate 38 from the base plate 90. Further, within the cavity 101, there is provided a driving device (not illustrated) of a push pin configured to receive the semiconductor wafer W from a transfer arm; configured to mount the semiconductor wafer W on the mounting table 39 or lift up the semiconductor wafer W from the mounting table 39; and configured to deliver the semiconductor wafer W to the transfer arm. Furthermore, this cavity 101 does not have a vacuum atmosphere but has an atmospheric atmosphere.

Above the mounting table 39, there is provided a facing electrode 110 to face the mounting table 39 with a space therebetween. This facing electrode 110 is configured as a so-called shower head and configured to supply a certain processing gas in a shower shape toward the semiconductor wafer W mounted on the mounting table 39. The facing electrode 110 may have ground potential or may be applied with a high frequency power. Further, a focus ring 290 is provided around the semiconductor wafer W on the mounting table 39. This focus ring 290 is configured to improve uniformity in a surface of the semiconductor wafer W during a plasma process.

The vacuum chamber 200 has a configuration in which the processing chamber 202 as an upper space of the mounting table 39 has a vacuum atmosphere, and the cavity 101 under the mounting table 39 has a normal pressure atmosphere. Therefore, the mounting table 39 serves as a part of a partition wall that separates the vacuum atmosphere from the normal pressure atmosphere. Further, in the mounting table 39, multiple temperature measurement windows 120, 130, 140, and 150 are formed. The temperature measurement windows 120, 130, 140, and 150 are optically communicated such that measurement lights can transmit an upper surface and a lower surface of the mounting table 39, and are airtightly sealed. A temperature measurement window 151 is formed downwardly from an upper part of the vacuum chamber 200 and is optically communicated, and is also airtightly sealed.

In an illustrative embodiment, among the temperature measurement windows 120, 130, 140, 150, and 151, the outermost temperature measurement window 150 in the mounting table 39 is configured to measure a temperature of the focus ring 290, and the other temperature measurement windows 120, 130, 140, and 151 are configured to measure a temperature of the semiconductor wafer W or a temperature of the facing electrode 110.

In the base plate 90, through holes 160, 170, 180, and 190 are formed to correspond to the temperature measurement windows 120, 130, 140, and 150, respectively. Collimators 240, 250, 260, and 270 are provided at outlets of optical fibers 201, 210, 220, and 230 for inducing measurement lights from a temperature measurement device, and these collimators are fixed at the through holes, respectively. Further, in the cavity 101 between the base plate 90 and the mounting table 39 (RF plate 38), a connection member 500 for connecting the base plate 90 and the mounting table 39 (RF plate 38) is provided. Furthermore, there is formed a through hole corresponding to the temperature measurement window 151. A collimator 271 is provided at an outlet of an optical fiber 231 for inducing a measurement light from the temperature measurement device, and the collimator 271 is fixed at the through hole corresponding to the temperature measurement window 151. Although FIG. 14 illustrates only one connection member 300, multiple (for example, four or more) connection members 300 may be provided in a circumference direction. These connection members 300 are configured to suppress deformation or vibration of the mounting table 39.

The optical fibers 201, 210, 220, 230, and 231 are connected to the light interference system 1 depicted in FIG. 1. That is, the collimators 240, 250, 260, 270, and 271 correspond to the collimators 12A and 12B depicted in FIG. 1.

Any light source can be used as long as interference between a measurement light and a reference light can be measured. If a temperature of the semiconductor wafer W is measured, it is desirable to use a light whose reflected light from a distance (generally ranging from about 800 μm to about 1500 μm) between a surface and a rear surface of the semiconductor wafer W does not cause interference. To be specific, it is desirable to use a low-coherence light. A low-coherence light is a light having a short coherence length. A central wavelength of a low-coherence light may be in a range of, for example, desirably from 0.3 μm to 20 μm and more desirably from 0.5 μm to 5 μm. Further, a coherence length may be in a range of, for example, desirably from 0.1 μm to 100 μm and more desirably 3 μm or less. By using a low-coherence light as a light source, obstruction due to unnecessary interference can be avoided said interference with a reference light based on a reflected light from the surface or an inner layer of the semiconductor wafer W can be easily measured.

A light source using the low-coherence light may include, for example, a super luminescent diode (SLD), a LED, a high luminance lamp (such as a tungsten lamp, a xenon lamp, and the like), and an ultra-broadband wavelength light source. Among these light sources using a low-coherence light, it is desirable to use a SLD having a high luminance (wavelength of, for example, 1300 nm) as a light source.

In the light interference system 1, the reference light is outputted from the collimators 240, 250, 260, 270, and 271 and outputted from the mounting table 39 to the wafer W, the focus ring 290, and the facing electrode 110 as measurement target objects.

As described above, since the light interference system 1 is provided in the substrate processing apparatus 100, it is possible to measure a thickness and a temperature of the wafer W, the focus ring 290, and the facing electrode 110. Further, when in-chamber parts such as the focus ring 290 or the facing electrode 110 accommodated in the processing chamber are measurement target objects, the in-chamber parts are made of a material transmissive to measurement lights. By way of example, a material of the in-chamber parts may be made of silicon, quartz, or sapphire.

Figure 15:
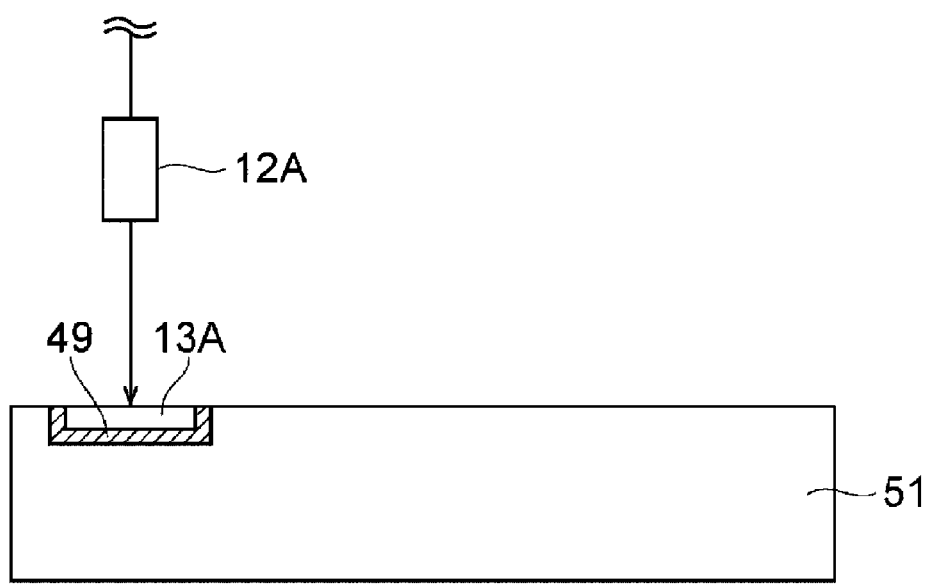
FIG. 15 shows an example of a substrate processing apparatus in accordance with an illustrative embodiment.

Although there has been explained an example where the measurement target objects 13A and 13B are measured in the above-described illustrative embodiment, a temperature of a final measurement target object may be measured through the temperatures of the measurement target objects 13A and 13B. By way of example, as depicted in FIG. 15, the measurement target object 13A is fixed on a final measurement target object 51 with an adhesive having a high thermal conductivity, and a light is emitted to the measurement target object 13A to measure the temperature thereof. Then, a temperature of the final measurement target object 51 may be estimated.

Further, although there has been explained an example where the optical circulator 11 is provided in the above-described illustrative embodiment, 2×1 or 2×2 photo couplers may be provided.

Furthermore, although there has been explained an example where the substrate processing apparatus includes multiple collimators, a single collimator may be used.

Moreover, although there has been explained an example where the light interference system 1 measures temperatures of the measurement target objects 13A and 13B, thicknesses may be measured from the optical path length nd.

EXPERIMENTAL EXAMPLE 1

Hereinafter, there will be explained Comparative Examples and Experimental Example carried out by the present inventor to explain the above-described effect.

(Peak Change when Simultaneously Measuring Temperatures of Multiple Measurement Points)

Figure 16A:
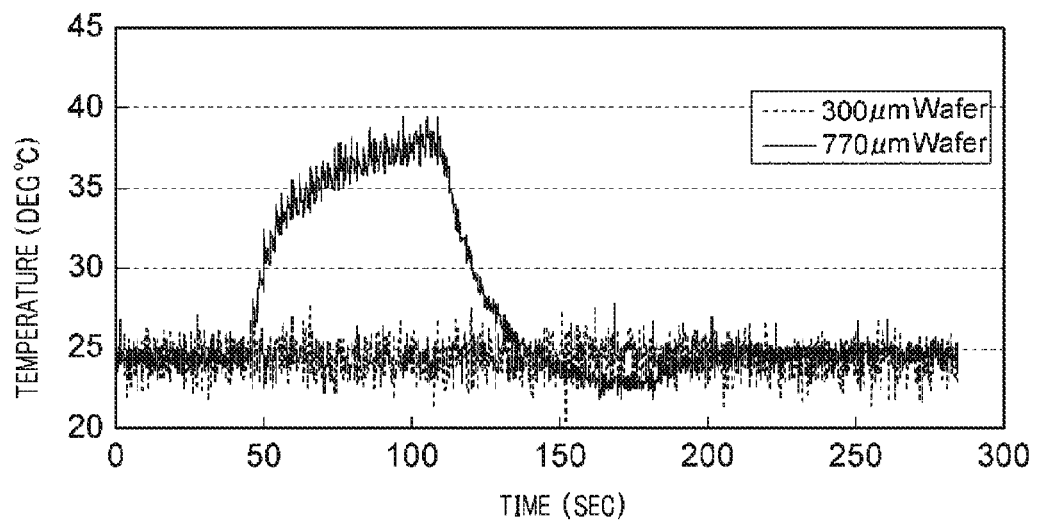
FIG. 16A shows measurement results of a wafer temperature depending on a time.
Figure 16B:
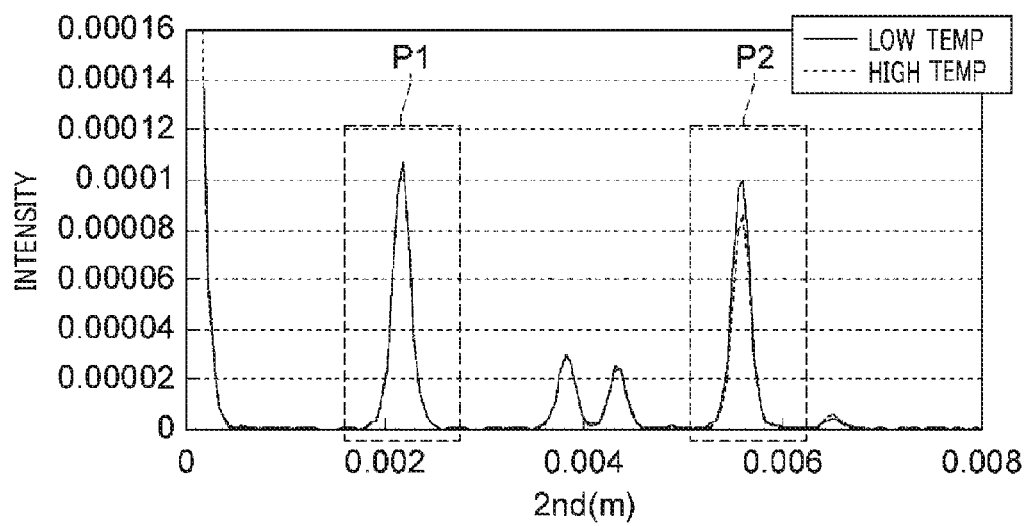
FIG. 16B shows a spectrum obtained by Fast Fourier Transform of a reflected light spectrum measured.

If multiple measurement points are measured simultaneously by a FFT frequency domain method, it is important that a change in a FFT peak of an interference spectrum does not affect other FFT peaks. For this reason, a wafer having a thickness of 300 μm is prepared as the measurement target object 13A and a wafer having a thickness of 770 μm is prepared as the measurement target object 13B, and as depicted in FIG. 16A. Then, a temperature of only the wafer having a thickness of 770 μm is increased, and then, the temperature thereof is decreased to be equal to that of the wafer having a thickness of 300 μm. A measurement result obtained by a light interference system 1 is shown in FIG. 16B. As shown in FIG. 16B, there is no change in peaks (range P1) caused by the wafer having a thickness of 300 μm even with a difference in temperature, and there is a change in peaks (range P2) caused by the wafer having a thickness of 770 μm with a difference in temperature. In other words, it is found out that the peaks are independent from each other and temperature may be measured individually.

(Intensity Improvement Effect)

EXPERIMENTAL EXAMPLE 1

The light interference system 1 depicted in FIG. 1 measures a reflection spectrum. A wafer having a thickness of 300 μm is used as the measurement target object 13A and a wafer having a thickness of 770 μm is used as the measurement target object 13B.

COMPARATIVE EXAMPLE 1

Instead of the collimator 42 and the mirror 43 of the light interference system 1 depicted in FIG. 1, a system including an antireflection-processed cap is used to measure a reflection spectrum. A wafer having a thickness of 300 μm is used as the measurement target object 13A and a wafer having a thickness of 770 μm is used as the measurement target object 13B.

COMPARATIVE EXAMPLE 2

An intensity of a measurement result of Comparative Example 1 is increased by a factor of 1.17.

Figure 17:
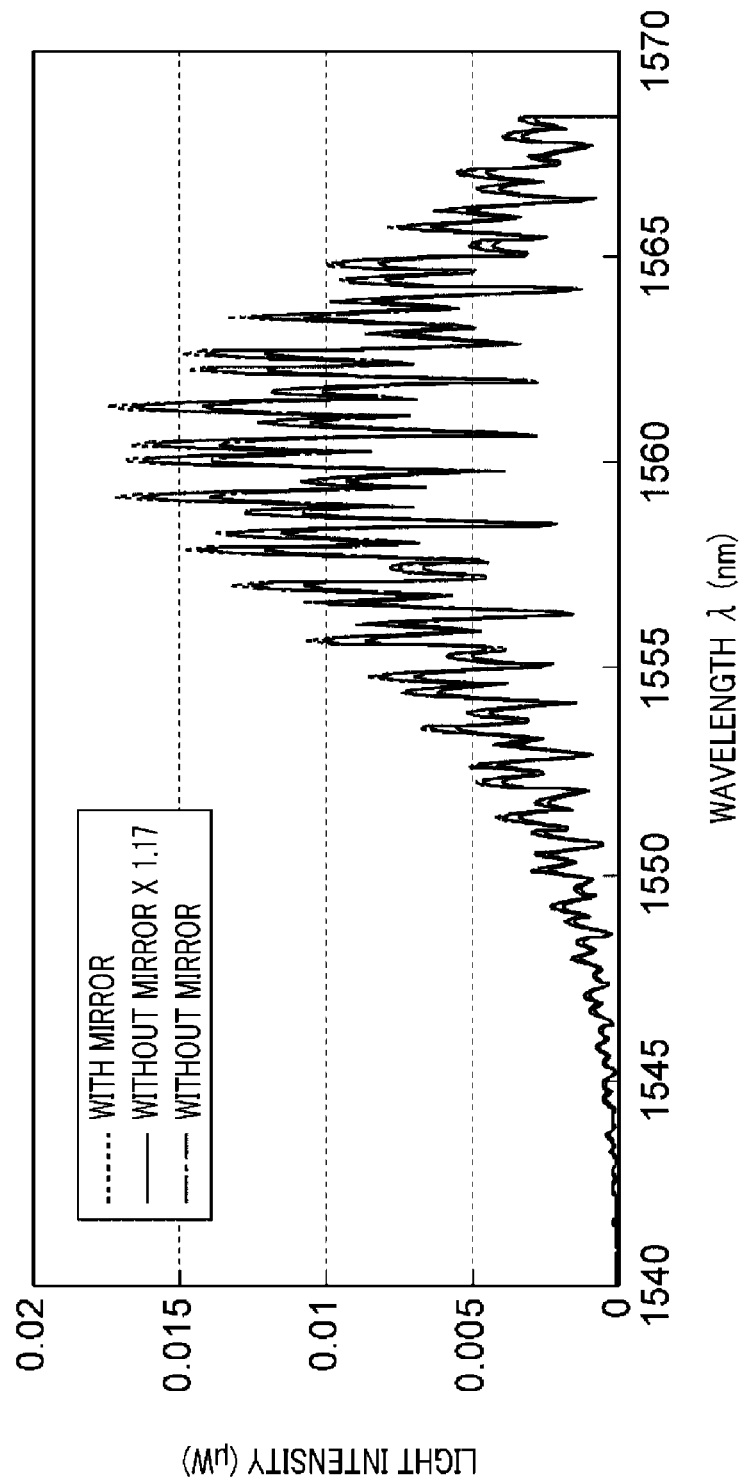
FIG. 17 is measurement results of light intensity depending on a wavelength.

Measurement results of Experimental Example 1 and Comparative Example 1 and a calculation result of Comparative Example 2 are shown in FIG. 17. It can be observed that as shown in FIG. 17, a light intensity of Experimental Example 1 is greater than that of Comparative Example 1. Further, it can be proven that a light intensity of Experimental Example 1 is substantially equal to that of Comparative Example 2 and increased by about 17%.

Figure 18:
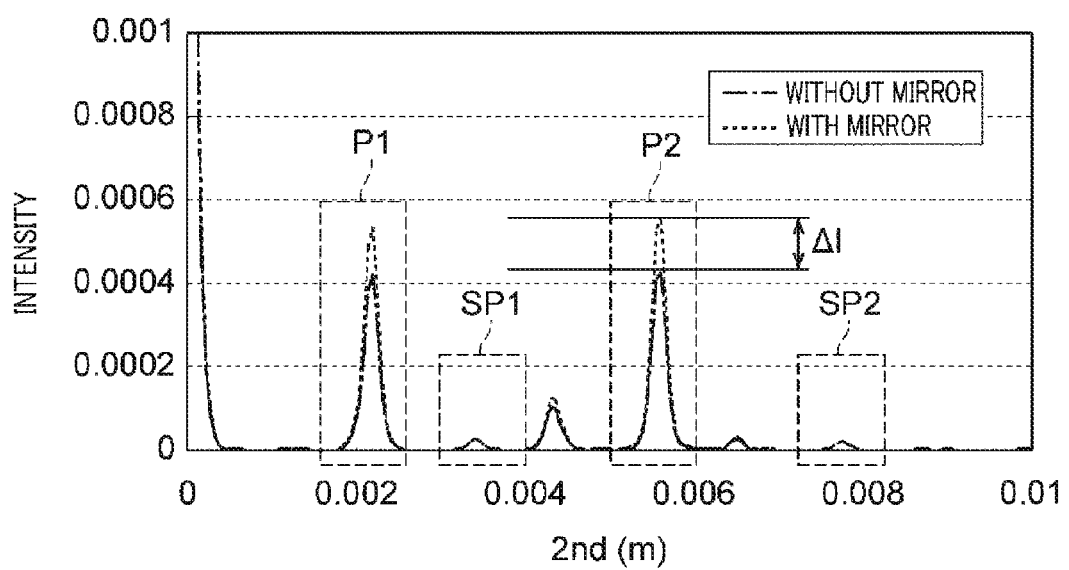
FIG. 18 is a spectrum obtained by Fast Fourier Transform of a reflected light spectrum measured.

FIG. 18 shows a spectrum obtained by performing FFT after performing 1/λ conversion on the horizontal axes of the measurement results of Experimental Example 1 and Comparative Example 1. A peak in a range P1 is used in obtaining temperature information of the wafer having a thickness of 300 μm, and a peak in a range P2 is used in obtaining temperature information of the wafer having a thickness of 770 μm. It can be observed that as shown in FIG. 18, an intensity of ΔI is increased in Experimental Example 1 as compared with Comparative Example 1. ΔI is about 28%. Further, peaks in ranges SP1 and SP2 are sub peaks caused by insertion of a mirror, but it can be confirmed that the sub peaks do not affect the peaks used in obtaining temperature information.

Figure 19:
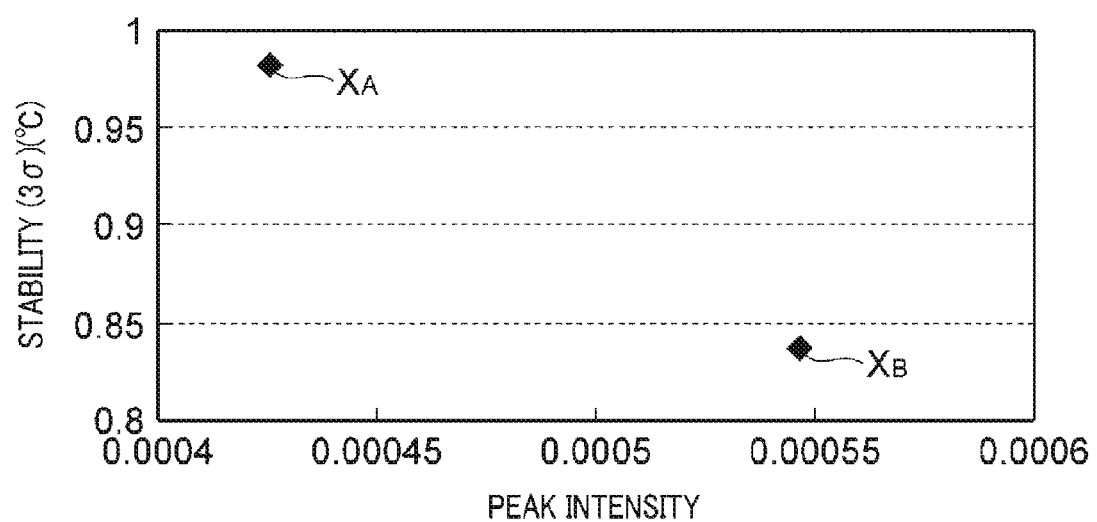
FIG. 19 is a stability evaluation graph.

FIG. 19 shows a result of evaluating a stability of a peak intensity in Experimental Example 1 and Comparative Example 1, and a horizontal axis denotes a peak intensity and a vertical axis denotes a stability 3σ (° C.). The stability is obtained by a 3σ method. A stability of Experimental Example 1 is represented by $X_A$ and a stability of Comparative Example 1 is represented by $X_B$. As shown in FIG. 19, the stability of Experimental Example 1 can be increased by about 15% as compared with Comparative Example 1.

What is claimed is:

1. A light interference system of measuring a thickness or a temperature of a measurement target object having a first main surface and a second main surface facing the first main surface, the light interference system comprising: a light source configured to emit a measurement light having a wavelength that transmits through the measurement target object; a coupler having multiple input terminals and multiple output terminals corresponding to the multiple input terminals, at least one of the multiple input terminals serving as a first input terminal configured to receive the measurement light from the light source; multiple first collimators respectively connected to the multiple output terminals of the coupler, each being configured to emit the measurement light to the first main surface of the measurement target object and to receive reflected lights from the first main surface and the second main surface; a transmission device provided at a side of the multiple input terminals except the first input terminal and configured to send the reflected lights from the multiple output terminals to the multiple output terminals again; a spectrometer connected to the first input terminal and configured to measure an interference intensity distribution that is an intensity distribution of the reflected lights from the first main surface and the second main surface, the interference intensity distribution being dependent on a wavelength; and a measurement unit connected to the spectrometer and configured to measure a thickness or a temperature of the measurement target object based on a waveform obtained by Fourier transform of the interference intensity distribution.

2. The light interference system of claim 1, wherein the transmission device includes mirrors provided at least one of the multiple input terminals except the first input terminal.

3. The light interference system of claim 1, wherein the transmission device is configured to connect two input terminals selected from the multiple input terminals except the first input terminal.

4. The light interference system of claim 1, wherein the transmission device comprises: second collimators respectively connected to the multiple input terminals except the first input terminal; and mirrors provided to face the second collimators.

5. A substrate processing apparatus including a light interference system of measuring a thickness or a temperature of a measurement target object having a first main surface and a second main surface facing the first main surface, the substrate processing apparatus comprising: a processing chamber configured to be evacuated and to accommodate therein the measurement target object, wherein the light interference system comprises: a light source configured to emit a measurement light having a wavelength that transmits through the measurement target object; a coupler having multiple input terminals and multiple output terminals corresponding to the multiple input terminals, at least one of the multiple input terminals serving as a first input terminal configured to receive the measurement light from the light source; multiple first collimators respectively connected to the multiple output terminals of the coupler, each being configured to emit the measurement light to the first main surface of the measurement target object and to receive reflected lights from the first main surface and the second main surface; a transmission device provided at a side of the multiple input terminals except the first input terminal and configured to send the reflected lights from the multiple output terminals to the multiple output terminals again; a spectrometer connected to the first input terminal and configured to measure an interference intensity distribution that is an intensity distribution of the reflected lights from the first main surface and the second main surface, the interference intensity distribution being dependent on a wavelength; and a measurement unit connected to the spectrometer and configured to measure a thickness or a temperature of the measurement target object based on a waveform obtained by Fourier transform of the interference intensity distribution.

\* \* \* \* \*

UNITED STATES PATENT AND TRADEMARK OFFICE
CERTIFICATE OF CORRECTION

PATENT NO.        : 8,941,843 B2
APPLICATION NO.   : 13/898664
DATED             : January 27, 2015
INVENTOR(S)       : Kenji Nagai It is certified that error appears in the above-identified patent and that said Letters Patent is hereby corrected as shown below:

In the Specification,

Column 9, formula 11, please replace

" $x_{max} = \frac{\lambda^2}{2n_{ave} \cdot \Delta\lambda} \cdot \frac{N_s}{2} = \frac{\lambda^2}{4\pi_{ave} \cdot \Delta\lambda} \cdot N_3$ " with -- $x_{max} = \frac{\lambda^2}{2n_{ave} \cdot \Delta\lambda} \cdot \frac{N_s}{2} = \frac{\lambda^2}{4n_{ave} \cdot \Delta\lambda} \cdot N_s$ --

Column 9, formula 12, please replace

" $X_{max} = 2 \cdot n_{ave} \cdot x_{max} = \frac{\lambda^2}{2 \cdot \Delta\lambda} \cdot N_x$ " with -- $X_{max} = 2 \cdot n_{ave} \cdot x_{max} = \frac{\lambda^2}{2 \cdot \Delta\lambda} \cdot N_s$ --

Column 10, formula 14, please replace

" $X_{max} = \frac{\lambda_0^2}{2 \cdot \Delta w} \cdot N_y$ " with -- $X_{max} = \frac{\lambda_0^2}{2 \cdot \Delta w} \cdot N_s$ --

Column 11, formula 20, please replace

" $S(x) = \exp(-x^2 \cdot \Delta k^2) = exp\left[-\left(\frac{x}{\Delta x'_y}\right)^2 \cdot \ln 2\right]$ " with -- $S(x) = \exp(-x^2 \cdot \Delta k^2) = exp\left[-\left(\frac{x}{\Delta x'_g}\right)^2 \cdot \ln 2\right]$ --

Signed and Sealed this
Thirtieth Day of June, 2015

Michelle K. Lee
*Director of the United States Patent and Trademark Office*

CERTIFICATE OF CORRECTION (continued)
U.S. Pat. No. 8,941,843 B2

Column 11, formula 21, please replace

" $\Delta k^2 = \frac{\ln 2}{\Delta x_s^2}$ " with -- $\Delta k^2 = \frac{\ln 2}{\Delta x_g^2}$ --

Column 19, line 63, please replace "500" with -- 300 --

Column 21, lines 12-14, please replace
 "EXPERIMENTAL EXAMPLE 1" with
 -- EXPERIMENTAL EXAMPLE --